(12) United States Patent
Tse et al.

(10) Patent No.: US 9,657,122 B2
(45) Date of Patent: May 23, 2017

(54) ETHYLENE-PROPYLENE COPOLYMERIC COMPOSITIONS WITH LONG METHYLENE SEQUENCE LENGTHS

(71) Applicant: ExxonMobil Chemical Patents Inc., Baytown, TX (US)

(72) Inventors: Mun F. Tse, Seabrook, TX (US); Jo Ann M. Canich, Houston, TX (US); Charles J. Ruff, Houston, TX (US); Daniel L. Bilbao, Houston, TX (US); Carlos U. DeGracia, LaPorte, TX (US); Ian C. Stewart, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/895,668

(22) PCT Filed: Jul. 16, 2014

(86) PCT No.: PCT/US2014/046858
§ 371 (c)(1),
(2) Date: Dec. 3, 2015

(87) PCT Pub. No.: WO2015/009832
PCT Pub. Date: Jan. 22, 2015

(65) Prior Publication Data
US 2016/0115263 A1    Apr. 28, 2016

Related U.S. Application Data

(60) Provisional application No. 61/847,467, filed on Jul. 17, 2013.

(51) Int. Cl.
| *C08F 210/02* | (2006.01) |
|---|---|
| *C08F 210/06* | (2006.01) |
| *C08F 210/16* | (2006.01) |
| *C08F 4/6592* | (2006.01) |
| *C08F 4/659* | (2006.01) |

(52) U.S. Cl.
CPC ......... *C08F 210/02* (2013.01); *C08F 210/06* (2013.01); *C08F 210/16* (2013.01); *C08F 4/65908* (2013.01)

(58) Field of Classification Search
CPC .. C08F 210/02; C08F 210/16; C08F 4/65908; C08F 4/65927
See application file for complete search history.

(56) References Cited

U.S. PATENT DOCUMENTS

| 4,814,540 A | 3/1989 | Watanabe et al. |
| 6,420,507 B1 | 7/2002 | Kale et al. |
| 2009/0209721 A1 | 8/2009 | Ikeda et al. |
| 2009/0318640 A1 | 12/2009 | Brant et al. |
| 2012/0245299 A1 | 9/2012 | Jiang et al. |
| 2012/0245311 A1 | 9/2012 | Crowther et al. |
| 2013/0030135 A1 | 1/2013 | Hagadorn et al. |

FOREIGN PATENT DOCUMENTS

| JP | 2005/336092 | 12/2005 |
| WO | 2009/012153 | 1/2009 |

OTHER PUBLICATIONS

U.S. Appl. No. 61/467,681, filed Mar. 25, 2011, Jiang et al.
Coates et al., "Synthesis of Allyl-Terminated Syndiotactic Polypropylene: Macromonomers for the Synthesis of Branched Polyolefins," Macromolecules, 2005, vol. 38, pp. 6259-6268.
Janiak et al., "Metallocene Catalysts for Olefin Oligomerization," Macromolecular Symposia, 2006, vol. 236, pp. 14-22.
Kaneyoshi et al., "Synthesis of Block and Graft Copolymers with Linear Polyethylene Segments by Combination of Degenerative Transfer Coordination Polymerization and Atom Transfer Radical Polymerization," Macromolecules, 2005, vol. 38, pp. 5425-5435.
Mader et al., "Influence of n-Alkyl Branches on Glass-Transition Temperatures of Branched Polyethylenes Prepared by Means of Metallocene- and Palladium-Based Catalysts," Macromolecules, 2000, vol. 33, pp. 1254-1261.
Markel et al., "Metallocene-Based Branch-Block Thermoplastic Elastomers," Macromolecules, 2000, vol. 33, pp. 8541-8548.
Moscardi et al., "Propene Polymerization with the Isospecific, Highly Regioselective rac-Me$_2$C(3-t-Bu-1-Ind)$_2$ZrCl$_2$/MAO Catalyst. 2. Combined DFT/MM Analysis of Chain Propagation and Chain Release Reactions," Organometallics, 2001, vol. 20, pp. 1918-1931.
Resconi et al., "Olefin Polymerization at Bis(pentamethylcyclopentadienyl)zirconium and -hafnium Centers: Chain-Transfer Mechanisms," Journal of American Chemical Society, 1992, vol. 114, pp. 1025-1032.
Rose et al., "Poly(ethylene-co-propylene macromonomer)s: Synthesis and Evidence for Starlike Conformations in Dilute Solution," Macromolecules, 2008, vol. 41, pp. 559-567.
Rulhoff et al., "Synthesis and Characterization of Defined Branched Poly(propylene)s with Different Microstructures by Copolymerization of Propylene and Linear Ethylene Oligomers ($C_n$= 26-28) with Matallocenes/MAO Catalysts," Macromolecular Chemistry and Physics, 2006, vol. 207, pp. 1450-1460.
Small et al., "Polymerization of Propylene by a New Generation of Iron Catalysts: Mechanisms of Chain Initiation, Propagation, and Termination," Macromolecules, 1999, vol. 32, pp. 2120-2130.

(Continued)

*Primary Examiner* — Caixia Lu
(74) *Attorney, Agent, or Firm* — Catherine L. Bell; Kevin M. Faulkner

(57) ABSTRACT

This invention relates to methods to prepare and compositions pertaining to branched ethylene-propylene copolymers that include at least 50% ethylene content by weight as determined by FTIR; a $g'_{vis}$ of less than 0.95; a $M_w$ of 125,000 to 300,000; a methylene sequence length of 6 or greater as determined by $^{13}$C NMR, wherein the percentage of sequences of the length of 6 or greater is more than 32%; and can have greater than 50% vinyl chain end functionality.

9 Claims, 16 Drawing Sheets

(56) References Cited

OTHER PUBLICATIONS

Teuben et al., "*Catalytic Olefin Oligomerization and Polymerization With Cationic Group IV Metal Complexes [Cp*$_2$MMe(THT)]$^+$[BPh$_4$]$^-$, M = Ti, Zr and Hf,*" Journal of Molecular Catalysis, 1990, vol. 62, pp. 277-287.

Weng et al., "*Synthesis of vinyl-terminated isotactic poly(propylene),*" Macromolecular Rapid Communications, 2000, vol. 21, pp. 1103-1107.

Yang et al., "*Cationic Metallocene Polymerization Catalysts. Synthesis and Properties of the First Base-Free Zirconocene Hydride\*\*,*" Angewandte Chemie International Edition in English, 1992, vol. 31, pp. 1375-1377.

Zhu et al., "*Copolymerization of Propylene with Poly(ethylene-co-propylene) Macromonomer and Branch Chain-Length Dependence of Rheological Properties,*" Macromolecules, 2002, vol. 35, pp. 10062-10070.

Zhu et al., "*Synthesis and Characterization of Long-Chain-Branched Polyolefins with Metallocene Catalysts: Copolymerization of Ethylene with Poly(ethylene-co-propylene) Macromonomer,*" Macromolecular Rapid Communications, 2003, vol. 24, pp. 311-315.

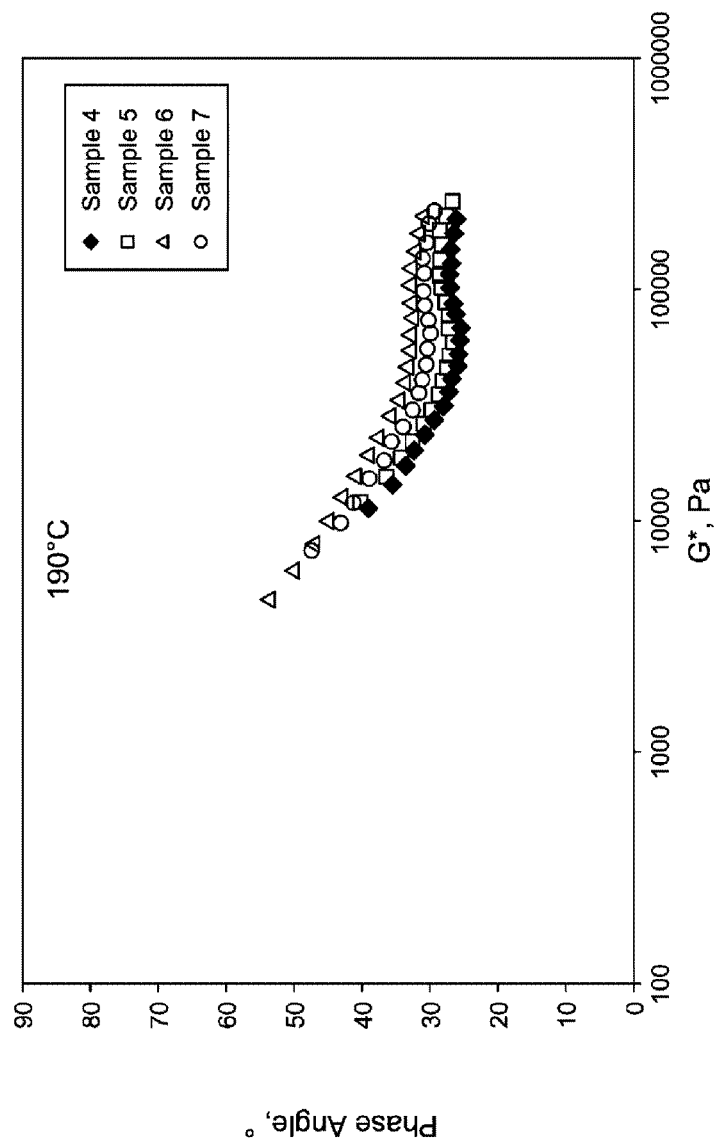

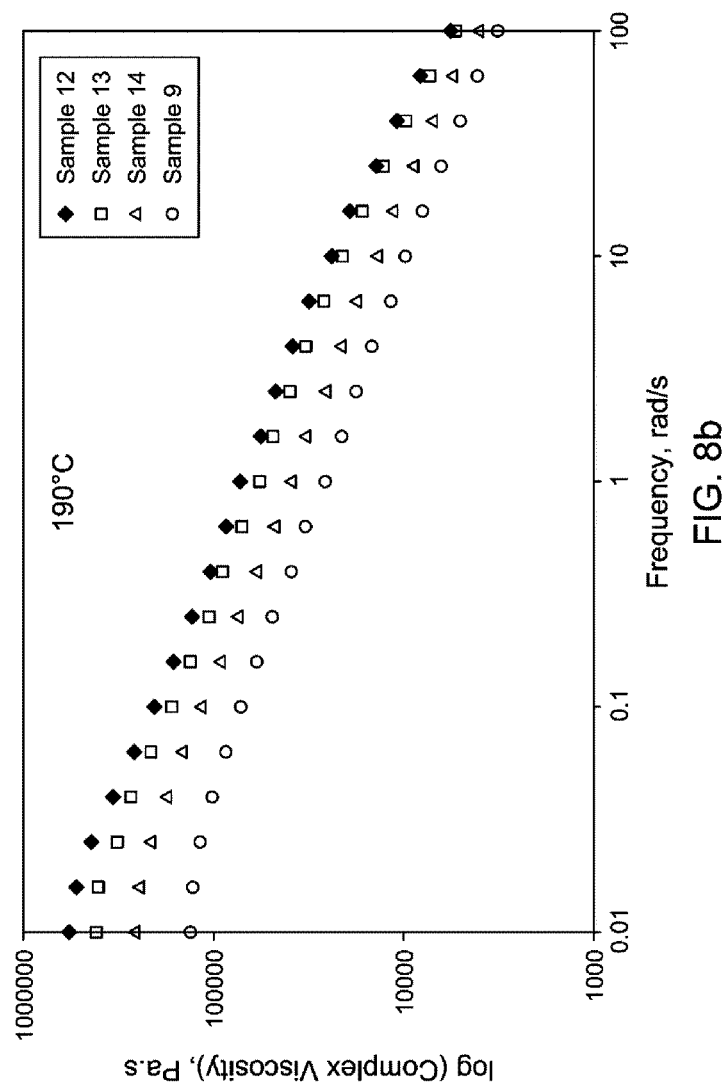

ETHYLENE-PROPYLENE COPOLYMERIC COMPOSITIONS WITH LONG METHYLENE SEQUENCE LENGTHS

CROSS-REFERENCE TO RELATED APPLICATIONS

This present application is a National Stage Application of International Application No. PCT/US2014/046858, filed Jul. 16, 2014, which is related to "Substituted Metallocene Catalysts", U.S. Ser. No. 61/847,442 filed Jul. 17, 2013; and claims priority to U.S. Ser. No. 61/847,467, filed Jul. 17, 2013, and to PCT/US2014/045542, filed on Jul. 7, 2014, PCT/US2014/045657 filed Jul. 8, 2014, U.S. Ser. No. 14/325,474 filed Jul. 8, 2014, PCT/US2014/045652 filed Jul. 8, 2014, and U.S. Ser. No. 14/325,449 filed Jul. 8, 2014, which are herein incorporated by reference.

FIELD OF THE INVENTION

Branched ethylene-propylene copolymers with a high degree of branching ($g'_{vis}$ of less than 1) and having 50 to 55 weight percent ethylene content as measured by $^{13}$C NMR are described. The copolymers can be used as compatibilizers for polymer blends.

BACKGROUND OF THE INVENTION

Alpha-olefins, especially those containing 6 to 20 carbon atoms, have been used as intermediates in the manufacture of detergents or other types of commercial products. Such alpha-olefins have also been used as monomers, especially in linear low density polyethylene. Commercially produced alpha-olefins are typically made by oligomerizing ethylene. Longer chain alpha-olefins, such as vinyl-terminated polyethylenes are also known and can be useful as building blocks following functionalization or as macromonomers.

Some relevant publications includes U.S. Pat. No. 4,814,540; JP 2005-336092 A2; US 2012-0245311 A1; Rulhoff et al. in 16 MACROMOLECULAR CHEMISTRY AND PHYSICS 1450-1460 (2006); Kaneyoshi et al. in 38 MACROMOLECULES 5425-5435 (2005); Teuben et al. 62 J. MOL. CATAL. 277-287 (1990); X. Yang et al., 31 ANGEW. CHEM. INTL. ED. ENGL. 1375-1377 (1992); Resconi et al. in 114 J. AM. CHEM. SOC. 1025-1032 (1992); Small and Brookhart 32 MACROMOLECULES 2120-2130 (1999); Weng et al., 21 MACROMOL RAPID COMM. 1103-1107 (2000); 33 MACROMOLECULES 8541-8548 (2000); Moscardi et al. in 20 ORGANOMETALLICS 1918-1931 (2001); Coates et al. in 38 MACROMOLECULES 6259-6268 (2005); Rose et al. 41 Macromolecules 559-567 (2008); Zhu et al., 35 Macromolecules 10062-10070(2002) and 24 MACROMOLECULES RAP. COMMUN. 311-315 (2003); Janiak and Blank in 236 MACROMOL. SYMP. 14-22 (2006). Other references include U.S. Ser. No. 13/072,280 filed Mar. 25, 2011, published on Sep. 27, 2012 and U.S. Ser. No. 61/467,681 filed Mar. 25, 2011, published on Sep. 27, 2012 also relate to olefin polymerization, particularly to produce vinyl terminated polymers.

However, few catalysts/processes have been shown to produce branched chain unsaturations in high yields, a wide range of molecular weight, and with high catalyst activity for ethylene-propylene-based polymerizations. The physical properties of branched oligomer and polymers have attracted considerable attention. Branching in an oligomer or a polymer can result in solution and solid-state properties markedly different than those of its linear counterpart. Accordingly, there is need for new catalysts and/or processes that produce branched polymers in high yields, with a wide range of molecular weight, and with high catalyst activity. There is further a need for branched ethylene-propylene copolymers having improved tensile properties, high melt strength and a high degree of shear thinning. Furthermore, there is a need for branched polyolefin reactive materials having high amounts of vinyl or allyl termination which can be functionalized and used in additive applications or as blending components. Additionally, ethylene-propylene copolymers with blockiness are needed as compatibilizer for the blends of ethylene-based polymers or copolymers and propylene-based polymers or copolymers.

SUMMARY OF THE INVENTION

Branched amorphous ethylene-propylene oligomers and polymers, and compositions comprising such branched amorphous ethylene-propylene oligomers and polymers are described. The branched ethylene-propylene copolymers (mEPC) include one or more of the following: at least 50% ethylene content by weight as determined by FTIR; a $g'_{vis}$ of less than 0.98; a $M_w$ of 125,000 to 300,000; a methylene sequence length of 6 or greater as determined by $^{13}$C NMR, wherein the percentage of sequences of the length of 6 or greater is more than 32%; and greater than 50% vinyl chain end functionality. Processes, preferably homogenous processes, for making the branched ethylene-propylene oligomers and polymers are described, wherein the processes comprise contacting ethylene and propylene with a catalyst system, comprising an activator and at least one metallocene.

0.543; Column Cal. C0=12.474; Column Cal. C1=−0.31335; Column Cal. C2=−0.0025044; Column Cal. C3=0; Inject Mark (ml)=31.837; Vistalon B1=0.916; Random Coil Analysis (5); A2 (Input Value)=0.001048; (dr/dc)=0.104; LS to DRI (ml)=0.152; LS to Vis. (ml)=0.392; K (sample)= 0.00042251; alpha (sample)=0.699; LS Calib. Const.=1.5333e-05; DRI Const.=3.605e-05; DP Const.=0.9328; IP Baseline=28.3 KPa.

Figure 6:
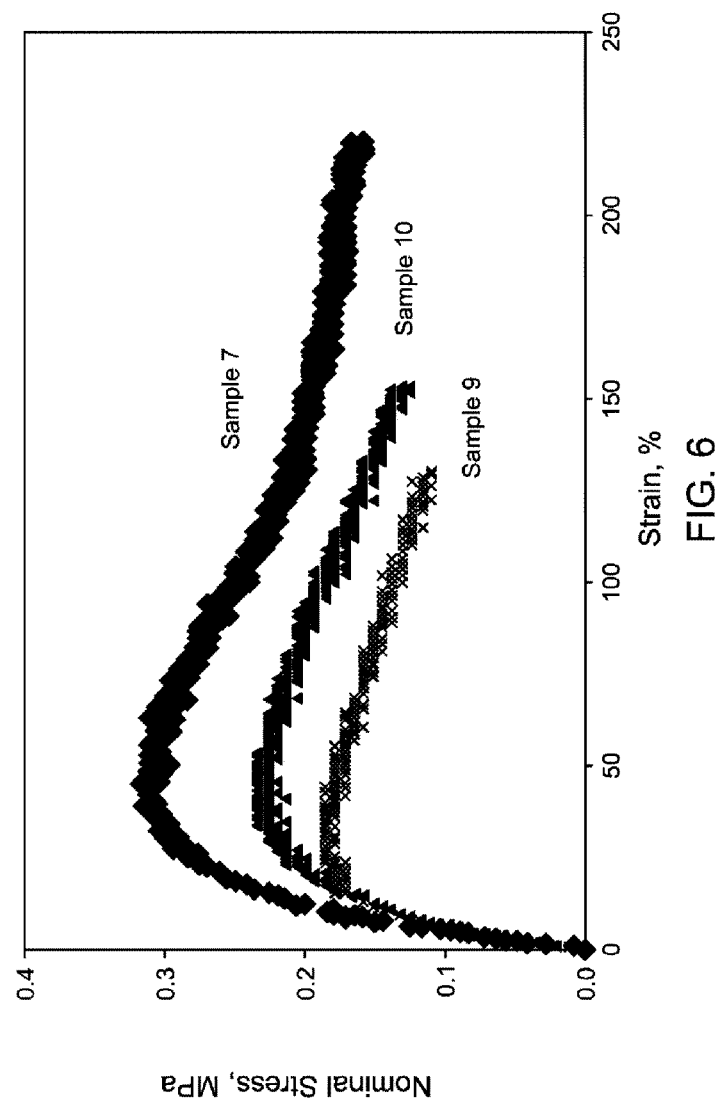

FIG. 6 is representative stress-strain curves of mEPCs measured at room temperature and a pull rate of 5.08 cm/min.

FIG. 7a provides Van Gurp-Palmen plots of mEPCs prepared with catalyst 1/activator 1.

Figure 7B:
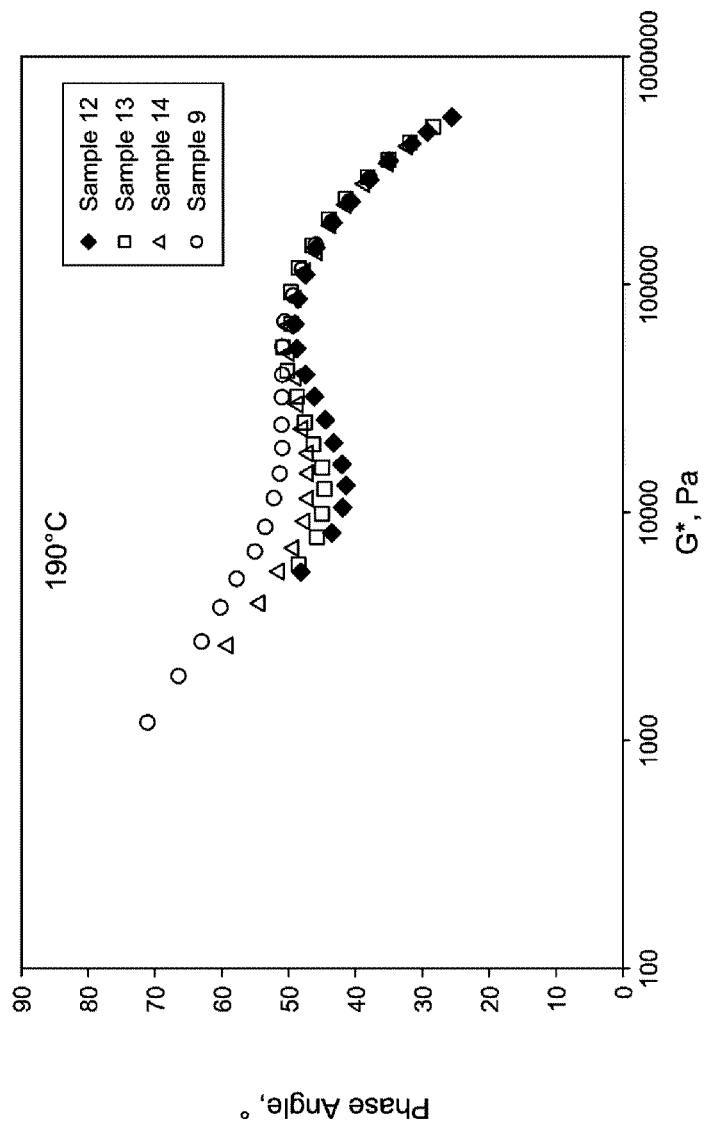

FIG. 7b provides Van Gurp-Palmen plots of mEPCs prepared with catalyst 2/activator 2.

Figure 8A:
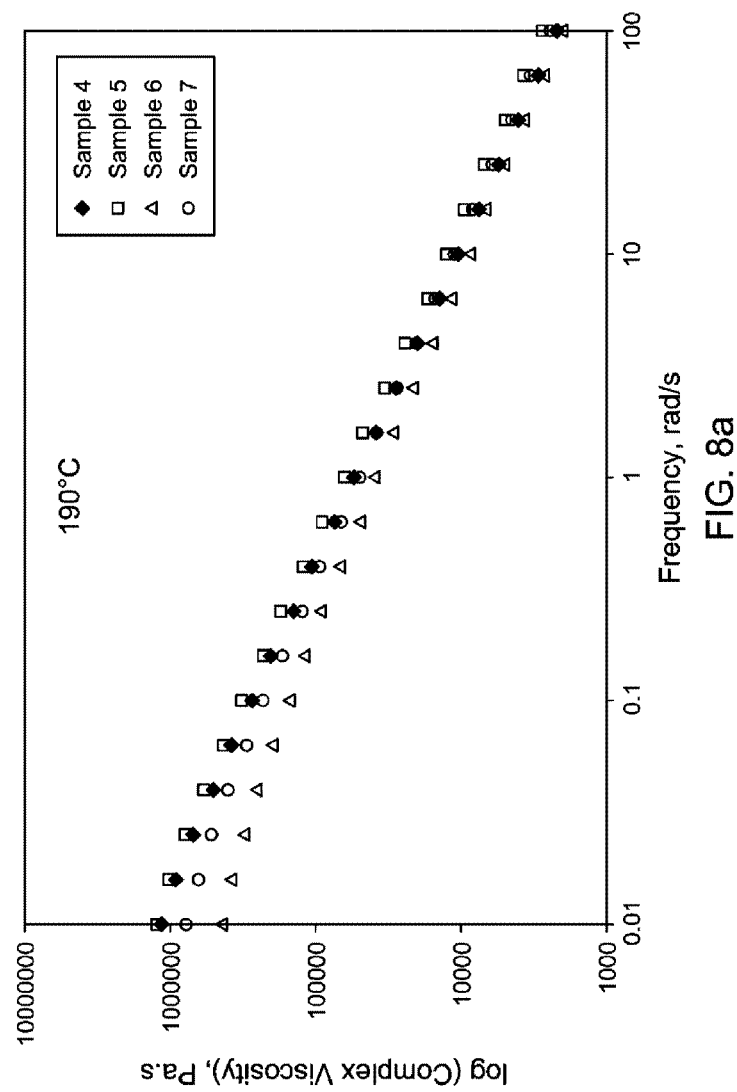

FIG. 8a provides the complex viscosity versus frequency of mEPCs prepared with catalyst 1/activator 1.

FIG. 8b provides the complex viscosity versus frequency of mEPCs prepared with catalyst 2/activator 2.

DETAILED DESCRIPTION

Described herein are branched ethylene-propylene oligomers and polymers and processes to produce the branched ethylene-propylene oligomers and polymers and compositions. "Branched" as used herein means a polyolefin having a $g'_{vis}$ of 0.98 or less. These branched polyolefins having high amounts of allyl chain ends may find utility as macromonomers for the synthesis of polyolefins, such as linear low density polyethylene, block copolymers, and as additives, for example, as additives to, or blending agents in, lubricants, waxes, and adhesives. Advantageously, when used as an additive, such as to film compositions, the branched nature of these polyolefins may improve rheological properties in molten state and desired mechanical properties by allowing optimal thermoforming and molding at lower temperatures, thereby reducing energy consumption of the film forming process, as compared to linear polyolefin analogues. Additionally, the high amounts of allyl chain ends of these branched polyolefins provides a facile path to functionalization. The functionalized branched polyolefins may be also useful as additives or blending agents.

The branched ethylene-propylene copolymers include one or more of the following: at least 50% ethylene content by weight as determined by FTIR; a $g'_{vis}$ of less than 0.98; a $M_w$ of 125,000 to 300,000 as determined from GPC-3D LS; a methylene sequence length of 6 or greater as determined by $^{13}C$ NMR, wherein the percentage of sequences of the length of 6 or greater is more than 32%; and greater than 50% vinyl chain end functionality.

The ethylene-propylene copolymer comprise ethylene derived units, as determined by FTIR, within the range of from 30 or 40 or 50 wt % to at least 55 or 60 or 65 wt % by weight of the copolymer, or alternatively the weight percent of ethylene in the ethylene-propylene copolymer is at least 50 wt %, more particularly from 50 wt % to 55 wt %, the remainder being propylene-derived units.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene and propylene, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less).

As used herein the term "branched oligomer or branched polymer" is defined as the polymer molecular architecture obtained when an oligomer (or a polymer) chain (also referred to as macromonomer) with reactive polymerizable chain ends is incorporated into another oligomer/polymer chain during the polymerization of the latter to form a structure comprising a backbone defined by one of the oligomer chains with branches of the other oligomer chains extending from the backbone. A linear oligomer differs structurally from the branched oligomer because of lack of the extended side arms. For some catalyst systems, the oligomer with a reactive polymerizable chain end can be generated in-situ and incorporated into another growing chain to form a homogeneous branched oligomers in a single reactor. A linear polymer has a branching index ($g'_{vis}$) of 0.98 or more, preferably 0.99 or more, preferably 1.0 (1.0 being the theoretical limit of $g'_{vis}$).

The inventive ethylene-propylene polymers disclosed herein are branched, having a branching index ($g'_{vis}$) of less than 0.98 (preferably 0.95 or less, preferably 0.90 or less, preferably 0.88 or less, even more preferably 0.87 or less).

The inventive copolymers also have a methylene sequence length of 6 or greater as determined by $^{13}C$ NMR, wherein the percentage of sequences of the length of 6 or greater is more than 32% (preferably greater than 40%, even more preferably greater than 45%).

Preferably, the heat of fusion of the ethylene-propylene copolymer has a heat of fusion ($\Delta H_f$) of from 5 or 10 or 12 or 16 J/g to 20 or 30 or 40 or 50 J/g.

The inventive ethylene-propylene copolymers have the number of terminal vinyl double bonds per chain of at least 50% or greater, preferrably at least 60% or greater, preferrably 70% or greater, preferably 75% or greater. Terminal vinyl double bonds per chain is also referred to as vinyl chain end functionality.

The ethylene-propylene copolymers described herein can also have one or more of the following characteristics.

In one embodiment, the branched ethylene-propylene copolymers described herein have a Mw/Mn range of from 2.0 to 3.5, preferably 2.2 to 2.6. Preferably, the Mw/Mn is less than 2.4. Both Mn and Mw are determined using GPC-DRI.

In one embodiment, the branched ethylene-propylene copolymers described herein have a $M_w$ of from 125,000 to 300,000 g/mole as determined from GPC-3D LS (preferably from 140,000 to 250,000 g/mole).

In one aspect, the branched ethylene-propylene copolymers described herein have a Mooney viscosity (ML (1+4) at 125° C.) of from 29 to 100 MU (preferably from 40 to 82; preferably from 50 to 68), where MU is Mooney Units.

In another aspect, the branched ethylene-propylene copolymers described herein have a Mooney large relaxation area (MLRA) of from 100 to 1000 MU-sec (preferably from 175 to 800; preferably from 275 to 650; preferably from 325 to 550).

In another aspect, the branched ethylene-propylene copolymers described herein have a MLRA/ML ratio greater than 5, alternatively greater than 6, alternatively greater than 7, alternatively greater than 8.

In still another aspect, the branched ethylene-propylene copolymers described herein have a melting point (Tm) within the range of from −30 or −20 or −10° C. to 10 or 20 or 30 or 40° C.

In yet another aspect, the branched ethylene-polymer copolymers described herein have an elongation (break) of 150% or greater and/or a nominal stress range of from 0.22 MPa to 0.32 MPa at 50% strain and/or 0.15 MPa to 0.2 MPa at 150% strain, at a pull rate of 5.08 centimeters/minute.

In an embodiment, the branched ethylene-propylene copolymers described herein have a phase angle of 50° at 8000 G*Pa and 25° at 500,000 G*Pa at 190° C.

In another embodiment, the branched ethylene-propylene copolymers herein have a phase angle of 45° at 10,000 G*Pa and a range of 25° to 35° at 100,000 G*Pa at 190° C.

In a preferred embodiment of the invention, the polymer produced herein is an ethylene-propylene copolymer, and the copolymer is blocky. A blocky copolymer is one in which the product of the reactivity ratios ($r_1 r_2$) is greater than 1. A copolymerization between monomers "E" and "P" in the presence of catalyst "M" can be represented by the following reaction schemes and rate equations where $R_{11}$ is the rate of "E" insertion after "E", $R_{12}$ is the rate of "P" insertion after "E", $R_{21}$ is the rate of "E" insertion after "P", $R_{22}$ is the rate of "P" insertion after "P", and $k_{11}$, $k_{12}$, $k_{21}$, and $k_{22}$ are the corresponding rate constants for each.

$$M\text{-}E+E \rightarrow M\text{-}E\text{-}E \quad R_{11}=k_{11}[M\text{-}E][E]$$

$$M\text{-}E+P \rightarrow M\text{-}P\text{-}E \quad R_{12}=k_{12}[M\text{-}E][P]$$

$$M\text{-}P+E \rightarrow M\text{-}E\text{-}P \quad R_{21}=k_{21}[M\text{-}P][E]$$

$$M\text{-}P+P \rightarrow M\text{-}P\text{-}P \quad R_{22}=k_{22}[M\text{-}P][P]$$

The reactivity ratios $r_1$ and $r_2$ are:

$$r_1 = \frac{k_{11}}{k_{12}}$$

$$r_2 = \frac{k_{22}}{k_{21}}$$

$$r_1 r_2 = \frac{k_{11} k_{22}}{k_{12} k_{21}}$$

The product of $r_1 \times r_2$ provides information on how the different monomers distribute themselves along the polymer chain.

| | | |
|---|---|---|
| $r_1 r_2 = 0$ | alternating copolymerization | EPEPEPEPEPEPEPEPEP |
| $r_1 r_2 = 1$ | random copolymerization | PPEPEPEPPEPPPEEPEEPE |
| $r_1 r_2 > 1$ | blocky copolymerization | PPPPEEEEEEPPPEEEEEPP |

In yet another aspect, the branched ethylene-propylene copolymers have an $r_1 r_2$ of from 2.7 to 2.8. Alternatively, the branched ethylene-propylene copolymers have an $r_1 r_2$ from 1.5 to 4.0 (preferably 2.0 to 3.5, more preferably 2.5 to 3.0).

Alternatively, the branched ethylene-propylene copolymers have a $r_1 r_2$ greater than 2.0, preferably greater than 2.5.

In still another embodiment, the branched ethylene-propylene copolymers herein have an average sequence length for methylene sequences two and longer of from 8 to 9.

In still yet another embodiment, the branched ethylene-propylene copolymers herein have an average sequence length for methylene sequences six and longer of from 12 to 14.

In some embodiments, the branched polymers have 50% or greater allyl chain ends (preferably 60% or more, preferably 70% or more, preferably 80% or more, preferably 90% or more, preferably 95% or more). Branched polymers generally have a chain end (or terminus) which is saturated and/or an unsaturated chain end. The unsaturated chain end of the inventive polymers comprises "allyl chain ends." An allyl chain end is represented by the formula:

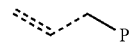

where "P" represents the rest of polymer chain. "Allylic vinyl group," "allyl chain end," "vinyl chain end," "vinyl termination," "allylic vinyl group" and "vinyl terminated" are used interchangeably in the following description.

The unsaturated chain ends may be further characterized by using bromine electrometric titration, as described in ASTM D 1159. The bromine number obtained is useful as a measure of the unsaturation present in the sample. In embodiments herein, branched polyolefins have a bromine number which, upon complete hydrogenation, decreases by at least 50% (preferably by at least 75%).

The inventions described herein relate to branched ethylene-propylene polymers and polymerization processes to produce them, wherein the formation of polymers with an allyl chain end and reinsertion of oligomers with allyl chain ends into another oligomer take place in the same polymerization zone or in the same reactor. Preferably a single catalyst system is used, however, two different metallocene catalysts can be used in combination, preferably wherein one metallocene catalyst is a symmetrical metallocene (meaning that both cyclopentadienyl-type groups are the same) and the other metallocene catalyst is unsymmetrical (meaning that each of the two cyclopentadienyl-type groups are different). Whether one or two different catalysts are used, at least one catalyst is capable of producing allyl chain terminated oligomers or polymers, and is capable of reinserting an allyl chain terminated oligomer or polymer into another growing chain to form a branched polymer.

Processes, preferably homogenous processes, for making the branched ethylene-propylene oligomers and polymers are described, wherein the processes comprise contacting ethylene and propylene with a catalyst system, comprising an activator and at least one metallocene. Suitable indenyl metallocene catalysts, activators and catalyst systems useful herein are those described herein below as well as those described in U.S. Ser. No. 14/325,449 filed Jul. 8, 2014, and U.S. Ser. No. 61/847,442 filed Jul. 17, 2013.

Suitable catalysts include, for example, rac-cyclotetramethylenesilylene-bis(2,4,7-trimethylindenyl)hafnium (IV) dimethyl. Suitable activators include, for example, dimethylanilinium tetrakisperfluoronaphthylborate.

Conversion is the amount of monomer and comonomers that are converted to polymer products, and is reported as weight percent and is calculated based on the polymer yield and the amount of monomer fed into the reactor.

Catalyst activity (also referred to as catalyst productivity) is a measure of amount of polymer product produced by unit weight of the catalyst in a given time period. For a continuous process, the catalyst activity is reported as the kilogram of polymer product (P) produced per kilogram of catalyst (cat) used (kgP/kgcat). In a batch process, catalyst activity is reported as the grams of polymer product produced per gram of catalyst and per hour (g P/g cat Hr).

The processes described herein can be run at temperatures and pressures suitable for commercial production of the branched ethylene-propylene polymers. Typical temperatures and/or pressures include a temperature greater than 35° C. (preferably in the range of from 35 to 150° C., from 40 to 140° C., from 60 to 140° C., or from 80 to 130° C.) and a pressure in the range of from 0.1 to 10 MPa (preferably from 0.5 to 6 MPa or from 1 to 4 MPa).

Suitable diluents/solvents for polymerization include non-coordinating and inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons such as cyclohexane, cycloheptane, methylcyclohexane, methylcycloheptane, and mixtures thereof, such as can be found commercially (Isopar™); and perhalogenated hydrocarbons such as perfluorinated $C_{4-10}$ alkanes. In a preferred embodiment, aliphatic hydrocarbons are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof.

Processes described herein can be carried out in any manner known in the art. Any bulk, homogeneous solution, boiling pool or slurry process known in the art can be used. Such processes can be run in a batch, semi-batch, or continuous mode. Homogeneous solution polymerization processes and solution are preferred. A homogeneous polymerization process is defined to be a process where at least 90 wt % of the product is soluble in the reaction media. A bulk homogeneous process is particularly preferred. A bulk polymerization process is carried out by using liquid monomors as a solvent. For the claim herein a bulk process is defined to be a process where monomer concentration in all feeds to the reactor is 70 vol % or more. Alternately, no solvent or diluent is present or added in the reaction medium (except for the small amounts used as the carrier for the catalyst system or other additives, or amounts typically found with the monomer; e.g., propane in propylene). By "continuous mode" is meant that there is continuous addition to, and withdrawal of reactants and products from, the reactor system. Continuous processes can be operated in steady state; i.e., the composition of effluent remains fixed with time if the flow rate, temperature/pressure and feed composition remain invariant. For example, a continuous process to produce a polymer would be one where the reactants are continuously introduced into one or more reactors and polymer product is continuously withdrawn.

The processes described herein have a residence time suitable for commercial production of the branched ethylene-propylene polymers. In a typical polymerization, the residence time of the polymerization process is up to 300 minutes, preferably in the range of from 5 to 300 minutes, preferably from 10 to 250 minutes, preferably from 10 to 120 minutes, or preferably from 10 to 60 minutes. At a given feed condition, long residence time may increase the monomer conversion, thereby increasing the oligomer concentration and decreasing the monomer concentration in a reactor. This will enhance the level of branching of the oligomer. In one embodiment, the residence time is used to control the branching level and to optimize the branching structures for specific end-uses.

The polymer product can be recovered from solution at the completion of the polymerization by any of the techniques well known in the art such as steam stripping followed by extrusion drying or by devolatilizing extrusion. Separated solvent/diluent and monomers can be recycled back in the reactor.

In a preferred embodiment, little or no scavenger is used in the process to produce the vinyl terminated polymers. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are present in the solvent at less than 1 wt %, preferably at 0.5 wt %, preferably at 0 wt % based upon the weight of the solvents); 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1); 5) the polymerization occurs in one reaction zone; 6) the productivity of the catalyst compound is at least 10,000 kg polymer/kg catalyst (preferably at least 15,000 kg polymer/kg catalyst, preferably at least 20,000 kg polymer/kg catalyst, preferably at least 50,000 kg polymer/kg catalyst, preferably at least 100,000 kg polymer/kg catalyst); 7) optionally scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound.

In one aspect, an embodiment also relates to a process for polymerization comprising:
(i) contacting, at a temperature greater than 35° C. (preferably in the range of from about 35 to 150° C., from 40 to 140° C., from 60 to 140° C., or from 80 to 130° C.), ethylene and propylene with a catalyst system capable of producing branched ethylene/propylene oligomers having allyl chain ends, the catalyst system comprising a metallocene catalyst compound and an activator;
(ii) converting at least 40 mol % of the monomer to polyolefin (preferably at least 50 mol %, at least 60 mol %, at least 70 mol %);
(iii) obtaining a branched ethylene propylene oligomer or polymers having greater than 50% vinyl chain end functionality (preferably 60% or more, preferably 70% or more, preferably 80% or more, preferably 90% or more, preferably 95% or more);
(iv) from about 50% to about 70% ethylene content by weight as determined by FTIR; and/or
(v) a methylene sequence length distribution of 6 or greater as determined by $^{13}C$ NMR, wherein the percentage of sequences of the length of 6 or greater is more than 32%.

Catalyst Systems

Catalysts useful herein include the catalysts capable of producing oligomers with reactive polymerizable chain ends and capable of incorporating oligomers with polymerizable chain ends to form branched oligomers or polymers.

In the description herein, the catalyst may be described as a catalyst precursor, a pre-catalyst compound, a catalyst compound, or a transition metal compound, and these terms are used interchangeably. A polymerization catalyst system is a catalyst system that can polymerize monomers to polymer. A "catalyst system" is a combination of at least one catalyst compound, at least one activator, an optional co-activator, and an optional support material. An "anionic ligand" is a negatively charged ligand which donates one or more pairs of electrons to a metal ion. A "neutral donor ligand" is a neutrally charged ligand which donates one or more pairs of electrons to a metal ion.

For the purposes of the embodiments and the claims thereto, when catalyst systems are described as comprising neutral stable forms of the components, it is well understood by one of ordinary skill in the art, that the ionic form of the component is the form that reacts with the monomers to produce polymers.

A metallocene catalyst is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof. The term "substituted" means that a hydrogen group has been replaced with a hydrocarbyl group, a heteroatom, or a heteroatom containing group. For example, methylcyclopentadiene (Cp) is a Cp group substituted with a methyl group.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be a radical, which contains hydrogen atoms and up to 50 carbon atoms and which may be linear, branched, or cyclic, and when cyclic, aromatic or non-aromatic.

Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Particularly useful metallocene catalysts include novel bridged a hafnium transition metal metallocene catalyst compounds having two indenyl ligands substituted at the 4 positions with a $C_1$ to $C_{10}$ alkyl, where the 3 positions are hydrogen (assuming the bridge position is counted as the one position) and the bridge is carbon or silicon which is incorporated into a cyclic group comprising 3, 4, 5 or 6 silicon and/or carbon atoms that make up the cyclic ring, preferably the 2, 4 positions, 4, 7 positions, 2, 4, 5 positions, 2, 4, 6 positions, 2, 4, 7 positions, or 2, 4, 5, 6, 7 positions are substituted, preferably by a $C_1$ to $C_{10}$ alkyl group, and optionally, if alkyl substituted, the 4 and 5, 5 and 6, and/or 6 and 7 positions may be bonded together to form a ring structure.

In a preferred embodiment this invention is related to metallocene catalyst compounds, and catalyst systems comprising such compounds, represented by the formula:

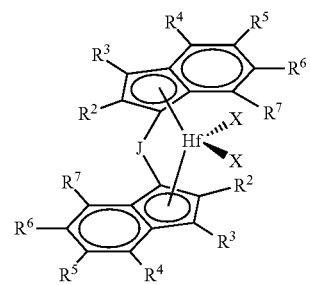

where each $R^3$ is hydrogen; each $R^4$ is independently a $C_1$-$C_{10}$ alkyl (preferably methyl, ethyl, propyl, butyl, pentyl, heptyl, hexyl, octyl, nonyl, decyl or an isomer thereof); each $R^2$, and $R^7$ are independently hydrogen, or $C_1$-$C_{10}$ alkyl (preferably hydrogen, methyl, ethyl, propyl, butyl, pentyl, heptyl, hexyl, octyl, nonyl, decyl or an isomer thereof); each $R^5$ and $R^6$ are independently hydrogen, or $C_1$-$C_{50}$ substituted or unsubstituted hydrocarbyl (preferably hydrogen, methyl, ethyl, propyl, butyl, pentyl, heptyl, hexyl, octyl, nonyl, decyl or an isomer thereof); and $R^4$ and $R^5$, $R^5$ and $R^6$ and/or $R^6$ and $R^7$ may optionally be bonded together to form a ring structure; J is a bridging group represented by the formula $R^a_2J$, where J is C or Si, and each $R^a$ is, independently $C_1$ to $C_{20}$ substituted or unsubstituted hydrocarbyl (preferably methyl, ethyl, propyl, butyl, pentyl, heptyl, hexyl, octyl, nonyl, decyl or an isomer thereof), and two $R^a$ form a cyclic structure incorporating J and the cyclic structure may be a saturated or partially saturated cyclic or fused ring system; and each X is is a univalent anionic ligand, or two Xs are joined and bound to the metal atom to form a metallocycle ring, or two Xs are joined to form a chelating ligand, a diene ligand, or an alkylidene ligand.

In a preferred embodiment of the invention, each $R^2$ is independently a $C_1$ to $C_3$ alkyl group, preferably methyl, ethyl, n-propyl, isopropyl or cyclopropyl, each $R^3$, $R^5$, $R^6$, and $R^7$ are hydrogen, and each $R^4$ is independently a $C_1$ to $C_4$ alkyl group, preferably methyl, ethyl, n-propyl, cyclopropyl, or n-butyl.

In a preferred embodiment of the invention, each $R^2$ is a $C_1$ to $C_3$ alkyl group, preferably methyl, ethyl, n-propyl, isopropyl or cyclopropyl, each $R^3$, $R^5$, and $R^6$ are hydrogen, and $R^4$ and $R^7$ are, independently, a $C_1$ to $C_4$ alkyl group, preferably methyl, ethyl, propyl, butyl, or an isomer thereof.

In a preferred embodiment of the invention, each $R^2$, $R^4$, and $R^7$ are independently methyl, ethyl, or n-propyl, each $R^5$ and $R^6$ are independently, a $C_1$ to $C_{10}$ alkyl group, preferably methyl, ethyl, propyl, butyl, pentyl, heptyl, hexyl, octyl, nonyl, decyl or an isomer thereof, R³ is hydrogen, and R⁵ and R⁶ are joined together to form a 5-membered partially unsaturated ring.

In a preferred embodiment of the invention, each R², R⁴ and R⁷ are the same and are selected from the group consisting of C₁ to C₃ alkyl group, preferably methyl, ethyl, propyl, and isomers thereof, and R³, R⁵ and R⁶ are hydrogen.

In a preferred embodiment of the invention, J is preferably represented by the formula:

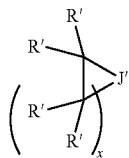

wherein J' is a carbon or silicon atom, x is 1, 2, 3, or 4, preferably 2 or 3, and each R' is, independently, hydrogen or C₁-C₁₀ hydrocarbyl, preferably hydrogen. Particularly preferred J groups include cyclopentamethylenesilylene, cyclotetramethylenesilylene, cyclotrimethylenesilylene, and the like.

In a preferred embodiment of the invention, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and C₁ to C₅ alkyl groups, preferably each X is a methyl, ethyl, propyl, butyl or pentyl group, preferably a methyl group.

In a preferred embodiment of the invention, R⁴ is not an aryl group (substituted or unsubstituted). An aryl group is defined to be a single or multiple fused ring group where at least on ring is aromatic. A substituted aryl group is an aryl group where a hydrogen has been replaced by a heteroatom or heteroatom containing group. Examples of aryl groups include phenyl, benzyl, carbazolyl, naphthyl, and the like.

In a preferred embodiment this invention, R², R⁴ and R⁷ are not a substituted or unsubstituted aryl group.

In a preferred embodiment this invention, R², R⁴, R⁵, R⁶ and R⁷ are not a substituted or unsubstituted aryl group.

Metallocene compounds that are particularly useful in this invention include one or more of:
cyclotetramethylenesilylene-bis(2,4,7-trimethylinden-1-yl) hafnium dimethyl,
cyclopentamethylenesilylene-bis(2,4,7-trimethylinden-1-yl) hafnium dimethyl,
cyclotrimethylenesilylene-bis(2,4,7-trimethylinden-1-yl) hafnium dimethyl,
cyclotetramethylenesilylene-bis(2,4-dimethylinden-1-yl) hafnium dimethyl,
cyclopentamethylenesilylene-bis(2,4-dimethylinden-1-yl) hafnium dimethyl,
cyclotrimethylenesilylene-bis(2,4-dimethylinden-1-yl)hafnium dimethyl,
cyclotetramethylenesilylene-bis(4,7-dimethylinden-1-yl) hafnium dimethyl,
cyclopentamethylenesilylene-bis(4,7-dimethylinden-1-yl) hafnium dimethyl,
cyclotrimethylenesilylene-bis(4,7-dimethylinden-1-yl)hafnium dimethyl,
cyclotetramethylenesilylene-bis(2-methyl-4-cyclopropylinden-1-yl)hafnium dimethyl,
cyclopentamethylenesilylene-bis(2-methyl-4-cyclopropylinden-1-yl)hafnium dimethyl,
cyclotrimethylenesilylene-bis(2-methyl-4-cyclopropylinden-1-yl)hafnium dimethyl,
cyclotetramethylenesilylene-bis(2-ethyl-4-cyclopropylinden-1-yl)hafnium dimethyl,
cyclopentamethylenesilylene-bis(2-ethyl-4-cyclopropylinden-1-yl)hafnium dimethyl,
cyclotrimethylenesilylene-bis(2-ethyl-4-cyclopropylinden-1-yl)hafnium dimethyl,
cyclotetramethylenesilylene-bis(2-methyl-4-t-butylinden-1-yl)hafnium dimethyl,
cyclopentamethylenesilylene-bis(2-methyl-4-t-butylinden-1-yl)hafnium dimethyl,
cyclotrimethylenesilylene-bis(2-methyl-4-t-butylinden-1-yl)hafnium dimethyl,
cyclotetramethylenesilylene-bis(4,7-diethylinden-1-yl)hafnium dimethyl,
cyclopentamethylenesilylene-bis(4,7-diethylinden-1-yl)hafnium dimethyl,
cyclotrimethylenesilylene-bis(4,7-diethylinden-1-yl)hafnium dimethyl,
cyclotetramethylenesilylene-bis(2,4-diethylinden-1-yl)hafnium dimethyl,
cyclopentamethylenesilylene-bis(2,4-diethylinden-1-yl)hafnium dimethyl,
cyclotrimethylenesilylene-bis(2,4-diethylinden-1-yl)hafnium dimethyl,
cyclotetramethylenesilylene-bis(2-methyl-4,7-diethylinden-1-yl)hafnium dimethyl,
cyclopentamethylenesilylene-bis(2-methyl-4,7-diethylinden-1-yl)hafnium dimethyl,
cyclotrimethylenesilylene-bis(2-methyl-4,7-diethylinden-1-yl)hafnium dimethyl,
cyclotetramethylenesilylene-bis(2-ethyl-4-methylinden-1-yl)hafnium dimethyl,
cyclopentamethylenesilylene-bis(2-ethyl-4-methylinden-1-yl)hafnium dimethyl,
cyclotrimethylenesilylene-bis(2-ethyl-4-methylinden-1-yl) hafnium dimethyl,
cyclotetramethylenesilylene-bis(2-methyl-4-isopropylinden-1-yl)hafnium dimethyl,
cyclopentamethylenesilylene-bis(2-methyl-4-isopropylinden-1-yl)hafnium dimethyl,
cyclotrimethylenesilylene-bis(2-methyl-4-isopropylinden-1-yl)hafnium dimethyl,
cyclotetramethylenesilylene-bis(4,6,8-trimethyl-1,2,3-trihydro-s-indacen-5-yl)hafnium dimethyl,
cyclopentamethylenesilylene-bis(4,6,8-trimethyl-1,2,3-trihydro-s-indacen-5-yl)hafnium dimethyl, and
cyclotrimethylenesilylene-bis(4,6,8-trimethyl-1,2,3-trihydro-s-indacen-5-yl)hafnium dimethyl.

In a preferred embodiment of the invention, the catalyst compound is in the rac form. In a preferred embodiment of the invention, at least 90 wt % of the catalyst compound is in the rac form, based upon the weight of the rac and meso forms present, preferably from 92 to 100 wt %, preferably from 95 to 100 wt %, preferably from 98 to 100 wt %. In a preferred embodiment of the invention, the catalyst compound is greater than 90% rac, preferably greater than 95% rac, preferably greater than 98% rac.

The metallocene compounds described herein are synthesized according to procedures known in the art. The synthesis of particularly useful metallocenes were prepared as described in U.S. Ser. No. 61/847,442, filed Jul. 17, 2013 and U.S. Ser. No. 14/325,449 filed Jul. 8, 2014.

Activators

In addition to the catalyst component described above, the catalyst system employed in the present process employs an activator preferably selected from alumoxanes, such as methyl alumoxane, modified methyl alumoxane, ethyl alumoxane, iso-butyl alumoxane, and the like; neutral activators, such as triphenyl boron, tris-perfluorophenyl boron, tris-perfluoronaphthylboron, tris-perfluorophenyl aluminum, and the like; and ionic activators, such as N,N-dimethylanilinium tetrakis perfluorophenyl borate, triphenyl carbonium tetrakis perfluorophenyl borate, N,N-dimethylanilinium tetrakis perfluoronaphthyl borate, N,N-dimethylanilinium tetrakis perfluorophenyl aluminate, and the like.

A co-activator is a compound capable of alkylating the transition metal complex, such that when used in combination with an activator, an active catalyst is formed. Co-activators include alumoxanes, such as methyl alumoxane; modified alumoxanes, such as modified methyl alumoxane; and aluminum alkyls, such as trimethyl aluminum, tri-isobutyl aluminum, triethyl aluminum, and tri-isopropyl aluminum. Co-activators are typically only used in combination with neutral activators and ionic activators when the pre-catalyst is not a dihydrocarbyl or dihydride complex.

The alumoxane component useful as an activator typically is an oligomeric aluminum compound represented by the general formula $(R^x\text{—Al—O})_n$, which is a cyclic compound, or $R^x(R^x\text{—Al—O})_n AlR^x_2$, which is a linear compound. In the general alumoxane formula, $R^x$ is independently a $C_1$-$C_{20}$ alkyl radical, for example methyl, ethyl, propyl, butyl, pentyl, isomers thereof, and the like, and "n" is an integer from 1-50. Most preferably, $R^x$ is methyl and "n" is at least 4. Methyl alumoxane and modified methyl alumoxanes are most preferred. For further descriptions see, EP 0 279 586; EP 0 594 218; EP 0 561 476; WO94/10180; and U.S. Pat. Nos. 4,665,208; 4,874,734; 4,908,463; 4,924,018; 4,952,540; 4,968,827; 5,041,584; 5,091,352; 5,103,031; 5,157,137; 5,204,419; 5,206,199; 5,235,081; 5,248,801; 5,329,032; 5,391,793; and 5,416,229.

When an alumoxane or modified alumoxane is used, the pre-catalyst (all pre-catalysts)-to-activator molar ratio is from about 1:3000 to about 10:1; alternatively 1:2000 to 10:1; alternatively 1:1000 to 10:1; alternatively 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the pre-catalyst (per metal catalytic site). The preferred minimum activator-to-pre-catalyst-ratio is 1:1 molar ratio.

The term "non-coordinating anion" (NCA) means an anion that does not coordinate to the catalyst metal cation or that does coordinate to the metal cation, but only weakly. An NCA coordinates weakly enough that a neutral Lewis base, such as an olefinically or acetylenically unsaturated monomer can displace it from the catalyst center. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal complex cation in the sense of balancing its ionic charge at +1, and yet retain sufficient liability to permit displacement by an ethylenically or acetylenically unsaturated monomer during polymerization. These types of cocatalysts sometimes use scavengers, such as, but not limited to, tri-iso-butyl aluminum, tri-n-octyl aluminum, tri-n-hexyl aluminum, triethylaluminum, or trimethylaluminum.

NCA activators (at times used in combination with a co-activator) may be used in the practice of this invention. Preferably, discrete ionic activators such as $[Me_2PhNH][B(C_6F_5)_4]$, $[Ph_3C][B(C_6F_5)_4]$, $[Me_2PhNH][B(C_6H_3\text{-}3,5\text{-}(CF_3)_2)_4]$, $[Ph_3C][B(C_6H_3\text{-}3,5\text{-}(CF_3)_2)_4]$, $[NH_4][B(C_6H_5)_4]$, $[Me_2PhNH][B(C_{10}F_7)_4]$, $[Ph_3C][B(C_{10}F_7)_4]$, or neutral activators, such as $B(C_6F_5)_3$, $B(C_{10}F_7)_3$, or $B(C_6H_5)_3$ can be used (where $C_6F_5$ is perfluorophenyl, $C_{10}F_7$ is perfluoronaphthyl, and $C_6H_3\text{-}3,5\text{-}(CF_3)_2$ is 3,5-bis(trifluoromethyl) phenyl). Preferred co-activators, when used, are alumoxanes, such as methyl alumoxane, modified alumoxanes, such as modified methyl alumoxane, and aluminum alkyls, such as tri-isobutyl aluminum, and trimethyl aluminum.

It is within the scope of this invention to use one or more types of NCA activators, which may be neutral or ionic, such as tri (n-butyl) ammonium tetrakis (pentafluorophenyl)borate, a trisperfluorophenyl boron metalloid precursor, or a trisperfluoronaphthyl boron metalloid precursor, polyhalogenated heteroborane anions (WO 98/43983), boric acid (U.S. Pat. No. 5,942,459).

Examples of neutral NCA activators include tri-substituted boron, tellurium, aluminum, gallium and indium or mixtures thereof. The three substituent groups are each independently selected from alkyls, alkenyls, halogen, substituted alkyls, aryls, arylhalides, alkoxy, and halides. Preferably, the three groups are independently selected from halogen, mono or multicyclic (including halosubstituted) aryls, alkyls, and alkenyl compounds and mixtures thereof, preferred are alkenyl groups having 1-20 carbon atoms, alkyl groups having 1-20 carbon atoms, alkoxy groups having 1-20 carbon atoms and aryl groups having 3-20 carbon atoms (including substituted aryls). More preferably, the three groups are alkyls having 1-4 carbon groups, phenyl, naphthyl, or mixtures thereof. Even more preferably, the three groups are halogenated, preferably fluorinated, aryl groups. Most preferably, the neutral NCA activator is trisperfluorophenyl boron or trisperfluoronaphthyl boron.

Ionic NCA activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. Ser. No. 08/285,380, filed Aug. 3, 1994, all of which are herein fully incorporated by reference. Activated ionic catalysts can be prepared by reacting a transition metal compound (pre-catalyst) with a neutral activator, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction. In this case, the ionic activator reacts with the transition metal compound (pre-catalyst) to form a cationic transition metal species, an anion, and byproduct(s). The byproducts are defined by the cation associated with the ionic NCA activator used.

Compounds useful as an ionic NCA activator comprise a cation, which is preferably a Bronsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic, diolefinic and acetylenically unsaturated substrates or other neutral Lewis bases, such as ethers, nitriles, and the like. Two classes of compatible non-coordinating anions have been disclosed in EP 0 277 003 A and EP 0 277 004 A, published 1988: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the ionic NCA activators include a cation and an anion component, and may be represented by the following formula:

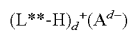

$$(L^{**}\text{-}H)_d^+(A^{d-})$$

wherein $L^{}$ is a neutral Lewis base; H is hydrogen; $(L^{}\text{-}H)^+$ is a Bronsted acid; $A^{d-}$ is a non-coordinating anion having the charge d−; d is 1, 2, or 3.

The cation component, $(L^{**}\text{-}H)_d^+$ may include Bronsted acids such as protons or protonated Lewis bases or reducible Lewis acids capable of protonating or abstracting a moiety, such as an alkyl or aryl, from the pre-catalyst after alkylation.

The activating cation $(L^{}\text{-}H)_d^+$ may be a Bronsted acid, capable of donating a proton to the alkylated transition metal catalytic precursor resulting in a transition metal cation, including ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline; phosphoniums from triethylphosphine, triphenylphosphine, and diphenylphosphine; oxomiuns from ethers, such as dimethyl ether, diethyl ether, tetrahydrofuran, and dioxane; sulfoniums from thioethers, such as diethyl thioethers and tetrahydrothiophene, and mixtures thereof. The activating cation $(L^{}\text{-}H)_d^+$ may also be a moiety, such as silver, tropylium, carbeniums, ferroceniums, and mixtures; preferably carboniums and ferroceniums; most preferably triphenyl carbonium.

The anion component $A^{d-}$ includes those having the formula $[M^{k+}Q_n]^{d-}$ wherein k is an integer from 1-3; n is an integer from 2-6; n−k=d; M is an element selected from group 13 of the Periodic Table of the Elements, preferably boron or aluminum; and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl having 1-20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic NCA activator is N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl) borate, triphenylcarbenium tetrakis(3,5-bis(trifluoromethyl)phenyl)borate, or triphenylcarbenium tetra(perfluorophenyl)borate.

The catalyst precursors employed in the present process can also be activated with cocatalysts or activators that comprise non-coordinating anions containing metalloid-free cyclopentadienide ions. These are described in U.S. Patent Publication 2002/0058765 A1, published on 16 May 2002, and for the instant invention, require the addition of a co-activator to the catalyst pre-cursor. The present process also can employ cocatalyst compounds or activator compounds that are initially neutral Lewis acids but form a cationic metal complex and a noncoordinating anion, or a zwitterionic complex upon reaction with the alkylated transition metal compounds. The alkylated transition metal compound is formed from the reaction of the catalyst pre-cursor and the co-activator. For example, tris(pentafluorophenyl)boron or aluminum act to abstract a hydrocarbyl ligand to yield an invention cationic transition metal complex and stabilizing noncoordinating anion, see EP 0 427 697 A and EP 0 520 732 A for illustrations of analogous group 4 metallocene compounds. Also, see the methods and compounds of EP 0 495 375 A. For formation of zwitterionic complexes using analogous Group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.*, 100, pp. 1391-1434 (2000).

When the cations of noncoordinating anion precursors are Bronsted acids, such as protons or protonated Lewis bases (excluding water), or reducible Lewis acids, such as ferrocenium or silver cations, or alkali or alkaline earth metal cations, such as those of sodium, magnesium, or lithium, the catalyst-precursor-to-activator molar ratio may be any ratio. Combinations of the described activator compounds may also be used for activation.

When an NCA activator is used, the pre-catalyst (all pre-catalysts)-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The pre-catalyst-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include methylalumoxane, modified methylalumoxane, mixtures of methylalumoxane with dimethylanilinium tetrakis(pentafluorophenyl)borate or tris(pentafluorophenyl)boron, and mixtures of trimethyl aluminum or triethyl aluminum or triisobutyl aluminum or tri-n-octylaluminum with dimethylanilinium tetrakis(pentafluorophenyl)borate or tris(pentafluorophenyl)boron or dimethylanilinium tetrakis(perfluoronaphthyl)borate. Particularly preferred activator/co-activator combinations include tri-n-octylaluminum with dimethylanilinium tetrakis(pentafluorophenyl)borate, tri-n-octylaluminum with dimethylanilinium tetrakis(perfluoronaphthyl)borate, and methylalumoxane with dimethylanilinium tetrakis(pentafluorophenyl)borate.

In some embodiments, scavenging compounds are used with NCA activators. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, isomers thereof, and each Z is independently $R^x$ or a different univalent anionic ligand, such as halogen (Cl, Br, I), alkoxide ($OR^x$), and the like. Most preferred aluminum alkyls include triethylaluminum, diethylaluminum chloride, tri-iso-butylaluminum, tri-n-octylaluminum. tri-n-hexylaluminum, trimethylaluminum, and the like. Preferred boron alkyls include triethylboron. Scavenging compounds may also be alumoxanes and modified alumoxanes including methylalumoxane and modified methylalumoxane.

The catalyst system useful in the present invention may further comprise a support material. Supports, methods of supporting, modifying, and activating supports for single-site catalyst, such as metallocenes, is discussed in, for example, METALLOCENE-BASED POLYOLEFINS, Vol. 1, pp. 173-218 (J. Scheirs & W. Kaminsky eds., John Wiley & Sons, 2000). Desirable carriers are inorganic oxides that include Group 2, 3, 4, 5, 13, and 14 oxides and chlorides in one embodiment, and more particularly, inorganic oxides and chlorides of Group 13 and 14 atoms. Yet more particularly, support materials include silica, alumina, silica-alumina, magnesium chloride, graphite, and mixtures thereof. Other useful supports include magnesia, titania, zirconia, montmorillonite (EP 0 511 665 B1), phyllosilicate, and the like. Also, combinations of these support materials may be used, for example, silica-chromium, silica-alumina, silica-titania, and the like. Additional support materials may include those porous acrylic polymers described in EP 0 767 184 B1.

In certain embodiments, the two catalyst components reside on a single support particle. Alternatively, each catalyst can be supported on different support particles.

The in-reactor blends described herein are used as the styrenic modifiers of linear ethylene containing polymers and are blended with at least one linear ethylene polymer to prepare the compositions of this invention. In a most preferred embodiment, rac-cyclotetramethylenesilylene-bis(2, 4,7-trimethylindenyl)hafnium (IV) dimethyl (catalyst 1)/dimethylanilinium tetrakisperfluoronaphthylborate (activator 1) was used to prepared ethylene-propylene copolymers (mEPCs) of this invention. For comparison, bis(para-triethylsilylphenyl)methylene(2,7-di-tert-butyl-fluoren-9-yl)(cyclopentadienyl)hafnium(IV) dimethyl (catalyst 2)/dimethylanilinium tetrakisperfluorophenylborate (activator 2), was used to prepare comparative mEPCs. At similar nominal ethylene content, two different types of copolymer sequence distributions were obtained. At an ethylene content of 55 wt %, the mEPC prepared with catalyst 1/activator 1 has, on average, longer methylene sequences based on $^{13}$C NMR studies, leading to a melting point ($T_m$) of 30° C. higher than the mEPC prepared with catalyst 2/activator 2. The former copolymer also has better tensile properties, a higher melt strength and a higher degree of shear thinning due to the presence of branching, as demonstrated by Mooney viscosity, GPC-3D, and $^1$H NMR.

This invention also relates to:
1. A branched ethylene-propylene copolymer comprising:
    at least 50 wt. % ethylene content by weight as determined by FTIR;
    a $g'_{vis}$ of less than 0.98;
    a methylene sequence length of 6 or greater as determined by $^{13}$C NMR, wherein the percentage of sequences of the length of 6 or greater is more than 32%; and
    greater than 50% vinyl chain end functionality is present.

2. The branched ethylene-propylene copolymer of paragraph 1, wherein the $g'_{vis}$ is less than 0.95 (alternatively less than 0.90, alternatively less than 0.88, alternatively less than 0.87).

3. The branched ethylene-propylene copolymer of any one of the previous paragraphs, wherein the ethylene-propylene copolymer has a vinyl chain end functionality greater than 60% (alternatively greater than 70%, alternatively 75% or greater).

4. The branched ethylene-propylene copolymer of any one of the previous paragraphs, wherein the ethylene-propylene copolymer has a heat of fusion from 5 J/g to 50 J/g (alternatively from 10 J/g to 40 J/g, alternatively from 10 J/g to 30 J/g, alternatively from 12 J/g to 20 J/g).

5. The branched ethylene-propylene copolymer of any one of the previous paragraphs, wherein the ethylene-propylene copolymer $T_m$ is from −10° C. to 40° C. (alternatively from −10° C. to 30° C., alternatively from −10° C. to 20° C., alternatively from −10° C. to 10° C.).

6. The branched ethylene-propylene copolymer of any one of the previous paragraphs, wherein the ethylene-propylene copolymer has a Mooney viscosity (ML) range at 125° C. of from 29 to 100 Mooney units (MU) (alternatively from 40 to 82 MU, alternatively from 50 to 68 MU).

7. The branched ethylene-propylene copolymer of any one of the previous paragraphs, wherein the branched ethylene-propylene copolymer has a Mooney large relaxation area (MLRA) of from 100 to 1000 (alternatively from 175 to 800, alternately from 275 to 650, alternatively from 325 to 550).

8. The branched ethylene-propylene copolymer of any one of the previous paragraphs, wherein the $r_1r_2$ is greater than 2 (alternatively greater than 2.5, alternatively greater than 3.0).

9. The branched ethylene-propylene copolymer of any one of the previous paragraphs, wherein the branched ethylene-propylene copolymer has an elongation (break) of at least 150%.

10. The branched ethylene-propylene copolymer of any one of the previous paragraphs, wherein the branched ethylene-propylene copolymer has a nominal stress range of from 0.22 MPa to 0.32 MPa at a 50% strain and 0.15 MPa to 0.2 MPa at 150% strain, at a pull rate of 5.08 centimeters/minute.

11. The branched ethylene-propylene copolymer of any one of the previous paragraphs, wherein the branched ethylene-propylene copolymer ethylene content is from 50 wt. % to 55 wt. % (alternatively from 50 wt. % to 60 wt. %, alternatively from 50 wt. % to 65 wt. %).

12. The branched ethylene-propylene copolymer of any one of the previous paragraphs, having a methylene sequence length of 6 or greater as determined by $^{13}$C NMR, wherein the percentage of sequences of the length of 6 or greater is more than 40% (alternatively more than 45%).

13. A process for the preparation of the ethylene/propylene branched polymer of any one of the previous paragraphs, wherein the process comprises:
    contacting ethylene and propylene, under polymerization conditions, with at least a catalyst system comprising an activator and at least one metallocene and
    obtaining a branched ethylene/propylene copolymer having at least 50% ethylene content by weight as determined by FTIR;
    a $g'_{vis}$ of less than 0.98;
    a methylene sequence length of 6 or greater as determined by $^{13}$C NMR, wherein the percentage of sequences of the length of 6 or greater is more than 32%; and greater than 50% vinyl chain end functionality is present.
14. The process of paragraph 13, wherein the process is a solution process.
15. The process of paragraphs 13 or 14 wherein the metallocene compound is represented by the formula:

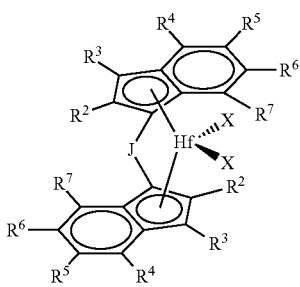

where each $R^3$ is hydrogen; each $R^4$ is independently a $C_1$-$C_{10}$ alkyl; each $R^2$, and $R^7$ are independently hydrogen, or $C_1$-$C_{10}$ alkyl; each $R^5$ and $R^6$ are independently hydrogen, or $C_1$-$C_{50}$ substituted or unsubstituted hydrocarbyl and $R^4$ and $R^5$, $R^5$ and $R^6$ and/or $R^6$ and $R^7$ may optionally be bonded together to form a ring structure; J is a bridging group represented by the formula $R^a{}_2J$, where J is C or Si, and each $R^a$ is, independently $C_1$ to $C_{20}$ substituted or unsubstituted hydrocarbyl, and two $R^a$ form a cyclic structure incorporating J and the cyclic structure may be a saturated or partially saturated cyclic or fused ring system; and each X is is a univalent anionic ligand, or two Xs are joined and bound to the metal atom to form a metallocycle ring, or two Xs are joined to form a chelating ligand, a diene ligand, or an alkylidene ligand.
16. The process of paragraphs 13 or 14, wherein the metallocene compound is one or more of:
cyclotetramethylenesilylenebis(2,4,7-trimethyl-indenyl)hafnium dimethyl,
cyclotrimethylenesilylenebis(2,4,7-trimethyl-indenyl)hafnium dimethyl,
cyclotetramethylenesilylenebis(2,4,7-trimethyl-indenyl)hafnium dichloride,
cyclotrimethylenesilylenebis(2,4,7-trimethyl-indenyl)hafnium dichloride,
or mixtures thereof.
17. The process of any one of paragraphs 13 through 16, wherein the activator is dimethylanilinium tetrakisperfluoronaphthylborate.

EXAMPLES

The $^{13}C$ solution NMR was performed on a 10 mm broadband probe using a field of at least 400 MHz in tetrachloroethane-d2 solvent at 120° C. with a flip angle of 90° and full NOE with decoupling. Sample preparation (polymer dissolution) was performed at 140° C. where 0.20 grams of polymer was dissolved in an appropriate amount of solvent to give a final polymer solution volume of 3 ml. Chemical shifts were referenced by setting the ethylene backbone (—CH2-)n (where n>6) signal to 29.98 ppm. Carbon NMR spectroscopy was used to measure the composition of the reactor products as submitted.

Chemical shift assignments for the ethylene-propylene copolymer are described by Randall in 'A Review Of High Resolution Liquid $^{13}$Carbon Nuclear Magnetic Resonance Characterization of Ethylene-Based Polymers', Polymer Reviews, 29:2, 201-317 (1989). The copolymer content (mole and weight %) is also calculated based on the method established by Randall in this paper. Calculations for $r_1r_2$ were based on the equation $r_1r_2=4*[EE]*[PP]/[EP]^2$; where [EE], [EP], [PP] are the diad molar concentrations; E is ethylene, P is propylene.

The values for the methylene sequence distribution and number average sequence lengths were determined based on the method established by James C. Randall, "Methylene sequence distributions and average sequence lengths in ethylene-propylene copolymers," Macromolecules, 1978, 11, 33-36.

Chain ends for quantization were identified using the signals shown in the table below. N-butyl and n-propyl were not reported due to their low abundance (less than 5%) relative to the chain ends shown in the table below.

| Chain end | $^{13}$C NMR Chemical shift |
|---|---|
| P~i-Bu | 23.5 to 25.5 and 25.8 to 26.3 ppm |
| E~i-Bu | 39.5 to 40.2 |
| P~Vinyl | 41.5 to 43 |
| E~Vinyl | 33.9 to 34.4 |

The number of vinyl chain ends, vinylidene chain ends and vinylene chain ends is determined using $^1$H NMR using 1,1,2,2-tetrachloroethane-d2 as the solvent on an at least 400 MHz NMR spectrometer, and in selected cases, confirmed by $^{13}$C NMR. Proton NMR data was collected at 120° C. in a 5 mm probe using a Varian spectrometer with a $^1$H frequency of at least 400 MHz. Data was recorded using a maximum pulse width of 45°, 5 seconds between pulses and signal averaging 120 transients. Spectral signals were integrated and the number of unsaturation types per 1000 carbons was calculated by multiplying the different groups by 1000 and dividing the result by the total number of carbons. The number averaged molecular weight (Mn) was calculated by dividing the total number of unsaturated species into 14,000, assuming one unsaturation per polyolefin chain.

The chain end unsaturations are measured as follows. The vinyl resonances of interest are between from 5.0 to 5.1 ppm (VRA), the vinylidene resonances between from 4.65 to 4.85 ppm (VDRA), the vinylene resonances from 5.31 to 5.55 ppm (VYRA), the trisubstituted unsaturated species from 5.11 to 5.30 ppm (TSRA) and the aliphatic region of interest between from 0 to 2.1 ppm (IA).

The number of vinyl groups/1000 Carbons is determined from the formula: (VRA*500)/((IA+VRA+VYRA+VDRA)/2)+TSRA). Likewise, the number of vinylidene groups/1000 Carbons is determined from the formula: (VDRA*500)/((IA+VRA+VYRA+VDRA)/2)+TSRA), the number of vinylene groups/1000 Carbons from the formula (VYRA*500)/((IA+VRA+VYRA+VDRA)/2) 25+TSRA) and the number of trisubstituted groups from the formula (TSRA*1000)/((IA+VRA+VYRA+VDRA)/2)+TSRA).
VRA, VDRA, VYRA, TSRA and IA are the integrated normalized signal intensities in the chemical shift regions defined above.

Molecular weights (number average molecular weight (Mn), weight average molecular weight (Mw), and z-average molecular weight (Mz)) were determined using a Polymer Laboratories Model 220 high temperature SEC equipped with on-line differential refractive index (DRI), light scattering (LS), and viscometer (VIS) detectors. It used three Polymer Laboratories PLgel 10 m Mixed-B columns for separation using a flow rate of 0.54 ml/min and a nominal injection volume of 300 µL. The detectors and columns were contained in an oven maintained at 135° C. The stream emerging from the SEC columns was directed into a miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun, P. Brant, R. R. Chance, and W. W. Graessley, in Macromolecules, Volume 34, Number 19, 6812-6820, (2001), incorporated herein by reference.

Solvent for the SEC experiment was prepared by dissolving 6 grams of butylated hydroxy toluene as an antioxidant in 4 liters of Aldrich reagent grade 1, 2, 4-trichlorobenzene (TCB). The TCB mixture was then filtered through a 0.7 µm glass pre-filter and subsequently through a 0.1 µm Teflon filter. The TCB was then degassed with an online degasser before entering the SEC. Polymer solutions were prepared by placing dry polymer in a glass container, adding the desired amount of TCB, then heating the mixture at 160° C. with continuous agitation for 2 hours. All quantities were measured gravimetrically. The TCB densities used to express the polymer concentration in mass/volume units were 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI was allowed to stabilize for 8 to 9 hours before injecting the first sample. The concentration, c, at each point in the chromatogram was calculated from the baseline-subtracted DRI signal, $I_{DRI}$, using the following equation:

$$K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes herein and the claims thereto (dn/dc)=0.104 for propylene containing polymers. Units of parameters used throughout this description of the SEC method are: concentration is expressed in g/cm³, molecular weight is expressed in g/mol, and intrinsic viscosity is expressed in dL/g.

The light scattering detector was a high temperature mini DAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient (for purposes herein, $A_2$=0.0006 for propylene containing polymers, (dn/dc)=0.104 for propylene containing polymers, $P(\theta)$ is the form factor for a monodisperse random coil, and $K_o$ is the optical constant for the system:

$$K_o = \frac{4\pi^2 n^2 \left(\frac{dn}{dc}\right)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, [η], at each point in the chromatogram was calculated from the following equation:

$$\eta_s = c[\eta] + 0.3(c[\eta])^2$$

where c is concentration and was determined from the DRI output.

The branching index ($g'_{vis}$) is defined as the ratio of the intrinsic viscosity of the branched polymer to the intrinsic viscosity of a linear polymer of equal molecular weight and same composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'_{vis} = \frac{[\eta]_{avg}}{k M_v^\alpha}$$

The intrinsic viscosity of the linear polymer of equal molecular weight and same composition was calculated using the Mark-Houwink equation. For purpose of the embodiments described herein and claims thereto, k=0.000579 and α=0.695 for ethylene polymers, and k=0.0002288 and α=0.705 for propylene polymers. For EP, the values of k and α are determined based on the ethylene/propylene composition using a standard calibration procedure such that: $k=(1-0.0048601 EP-6.8989\times10^{-6} EP^2)\times 5.79\times10^{-4}(200000)^{-Trunc(0.1EP)/1000}$ and α=0.695+Trunc(0.1EP)/1000, where EP is the weight percent of propylene in the EP, and Trunc indicates that only the integer portion is kept in the calculation. For example, Trunc(5.3)=5. $M_V$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and α exponents. The molecular weight data reported here are those determined using GPC DRI detector, unless otherwise noted.

Viscosity was measured using a Brookfield Viscometer according to ASTM D-3236.

Peak melting point, Tm, (also referred to as melting point), peak crystallization temperature, Tc, (also referred to as crystallization temperature), glass transition temperature (Tg), heat of fusion ($\Delta H_f$), and percent crystallinity were determined using the following DSC procedure according to ASTM D3418-03. Differential scanning calorimetric (DSC) data were obtained using a TA Instruments model Q200 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided however that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

All of the examples were produced in a 1-liter, solution-phase continuous stirred tank reactor. The reactor temperature was controlled by metering a mixture of chilled water and steam to the reactor jacket, and reactor pressure was maintained by adjusting the set pressure on a back-pressure regulator downstream of the reactor. Raw materials (ethylene, propylene, isohexane, and toluene) were obtained from an integrated pipeline source. Isohexane and toluene were further purified by passing the material through a series of adsorbent columns containing either 3 A mole sieves (isohexane) or 13× mole sieves (toluene) followed by treatment with alumina. Ethylene and propylene monomers were purified on-line by passing the feed streams through beds of 3 A mole sieves, and metered to a mixing manifold using mass flow controllers (Brooks), where they were combined with the isohexane solvent prior to entering the reactor. Separate feeds of scavenger (tri-n-octyl aluminum in isohexane) and catalyst (premixed with activator in toluene), were also supplied to the reactor. Nominal reactor residence times were on the order of 10 minutes, after which the continuous reactor effluent was collected and first air-dried in a hood to evaporate most of the solvent and unreacted monomers, and then dried in a vacuum oven at a temperature of 80° C. for 12 hours. The vacuum oven dried samples were then weighed to obtain the final polymer yield which could then be used to calculate catalyst activity (also referred as to catalyst productivity) based on the ratio of yield to catalyst feed rate.

Two different metallocene/activator systems, catalyst 1/activator 1 and catalyst 2/activator 2, were used to prepare ethylene/propylene copolymers (metallocene derived ethylene/propylene copolymers, "mEPCs") with various ethylene contents in a semi-continuous lab reactor. The process conditions and the characterization of some mEPCs prepared with catalyst 1/activator 1 are shown in Table 1.

The polymer $C_2$ wt % was measured by FTIR, ASTM D3900.

LS and DRI denote the methods of light scattering and differential refractive index detectors used in the GPC-3D experiment, respectively. Used in conjuction with Mw, Mn, or Mw/Mn, they designate the methodology used for the corresponding measurement.

ML is the Mooney viscosity and MLRA is the Mooney (large) relaxation area for 100 s, both measured at 125° C. In this specification, ML and ML (1+4) @ 125° C. are the same. ML and MLRA are measured using a Mooney viscometer, operated at an average shear rate of 2 $s^{-1}$, according to the following modified ASTM D1646.

A square of sample is placed on either side of the rotor. The cavity is filled by pneumatically lowering the upper platen. The upper and lower platens are electrically heated and controlled at 125° C. The torque to turn the rotor at 2 rpm is measured by a torque transducer. The sample is preheated for 1 minute after the platens were closed. The motor is then started and the torque is recorded for a period of 4 minutes. Results are reported as ML (1+4) at 125° C., where M is Mooney viscosity number, L denotes the large rotor, 1 is the sample preheat time in minutes, 4 is the sample run time in minutes after the motor starts, and 125° C. is the test temperature. The MLRA data is obtained from the Mooney viscosity measurement when the rubber relaxed after the rotor is stopped. The MLRA is the integrated area under the Mooney torque-relaxation time curve from 1 to 100 seconds. The MLRA can be regarded as a stored energy term which suggests that, after the removal of an applied strain, the longer or branched polymer chains can store more energy and require longer time to relax. Therefore, the MLRA value of a bimodal rubber (the presence of a discrete polymeric fraction with very high molecular weight and distinct composition) or a long chain branched rubber are larger than a broad or a narrow molecular weight rubber when compared at the same Mooney viscosity values.

Processability is arguably one of the most important and critical properties of rubber and rubber compounds. Mooney viscosity is a property used to monitor the quality of both natural and synthetic rubbers. It measures the resistance of rubber to flow at a relatively low shear rate. The highly branched compositions herein have a Mooney viscosity ML (1+4) at 125° C. of 30 to 100 MU (preferably 40 to 100; preferably 50 to 100; preferably 60 to 100), where MU is Mooney Units.

While the Mooney viscosity indicates the plasticity of the rubber, the Mooney relaxation area (MLRA) provides a certain indication of the effects of molecular weight distribution and elasticity of the rubber. The highly branched compositions also have a MLRA of 100 to 1000 MU-sec (preferably 150 to 800 MU-sec; preferably 170 to 700 MU-sec), where MU-sec is Mooney Units-seconds.

Another indication of melt elasticity is the ratio of MLRA/ML. This ratio has the dimension of time and can be considered as a "relaxation time." A higher number signifies a higher degree of melt elasticity. Long chain branching will slow down the relaxation of the polymer chain, hence increasing the value of MLRA/ML. The highly branched compositions of this invention preferably have an (MLRA)/ML greater than 5, preferably greater than 6, preferably greater than 7 and most preferably greater than 8 for mEPCs with a Mw/Mn from about 2 to 3.

Figure 1:
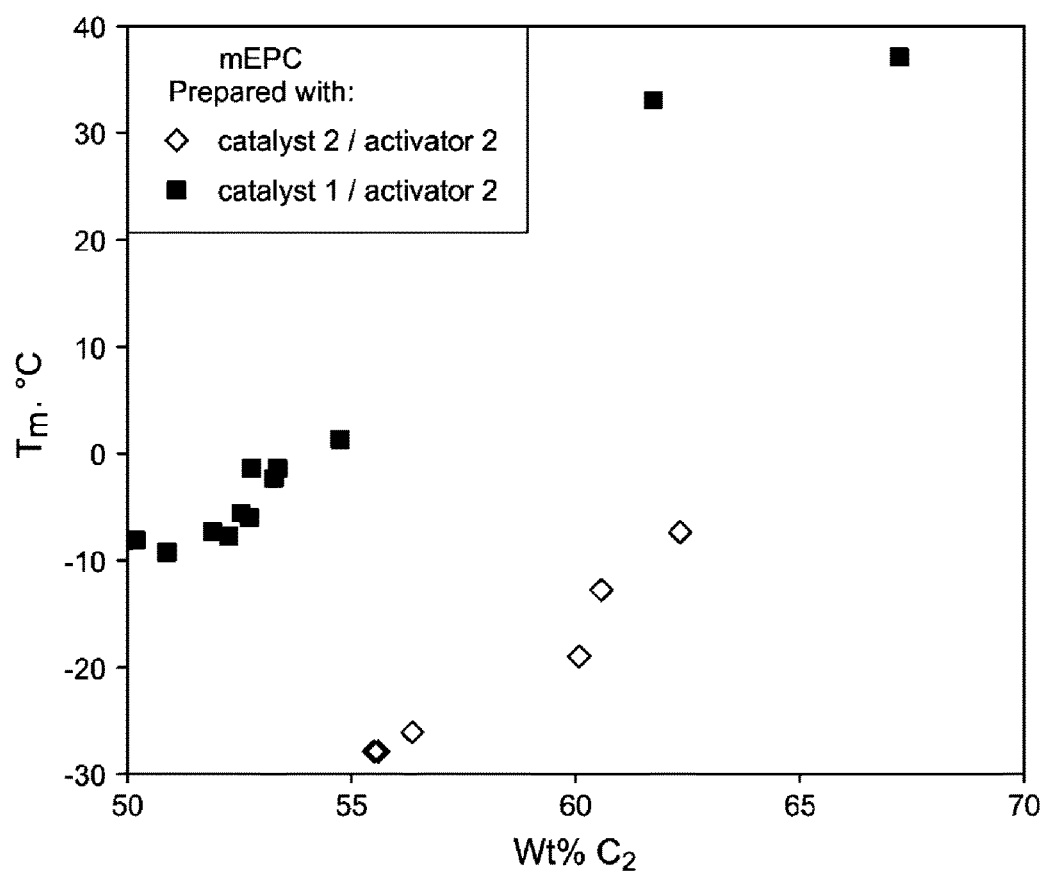
FIG. 1 provides mEPCs made by catalyst 1/activator 1 have much higher melting points than mEPCs made by catalyst 2/activator 2.
Figure 2:
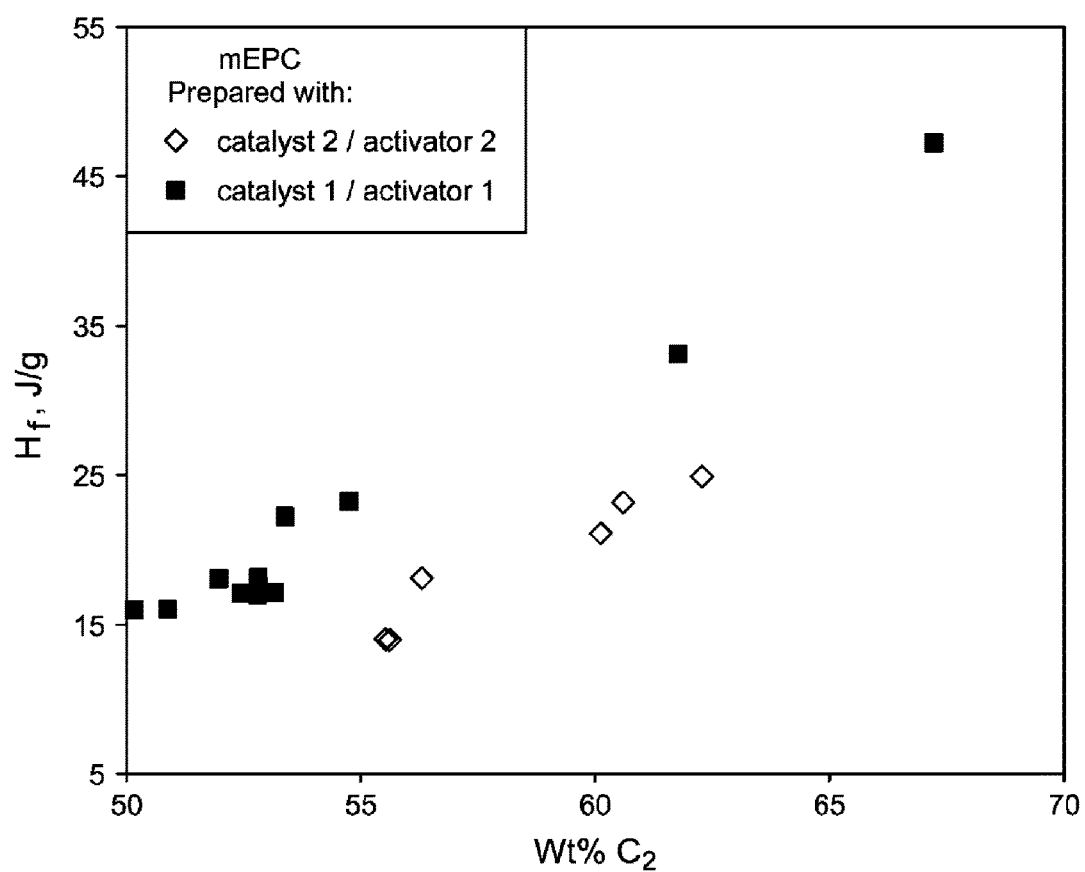
FIG. 2 demonstrates that mEPCs made by catalyst 1/activator 1 have higher heats of fusion than mEPCs made by catalyst 2/activator 2.

There are essentially no gels in the present mEPCs based on the fact that the values of GPC-3D mass recovery are all greater than or equal to 90%. Using the DSC second melt experiments, the values of the melting point ($T_m$) and the heat of fusion ($H_f$) of a larger group of these copolymers were determined, FIGS. 1-2. The melting temperature, $T_m$, of the polymers were measured using a DSC Q100 equipped with 50 auto-samplers from TA Instruments. This DSC was calibrated with an indium standard weekly. Typically, 6-10 mg of a polymer was sealed in an aluminum pan with a hermetic lid and loaded into the instrument. In a nitrogen environment, the sample was first cooled to −90° C. at 20° C./min. The sample was heated to 220° C. at 10° C./min and melting data (first heat) were acquired. This provides information on the melting behavior under as-received conditions, which can be influenced by thermal history as well as sample preparation method. The sample was then equilibrated at 220° C. to erase its thermal history.

Crystallization data (first cool) were acquired by cooling the sample from the melt to −90° C. at 10° C./min and equilibrated at −90° C. Finally, the sample was heated again to 220° C. at 10° C./min to acquire additional melting data (second heat). The endothermic melting transition (second heat) was analyzed for peak temperature as Tm and for area under the peak as heat of fusion (Hf).

The mEPCs made by catalyst 1/activator 1 have higher values of $T_m$ and $H_f$ than the mEPCs made by catalyst 2/activator 2. At an ethylene content of 55 wt %, the mEPC prepared with catalyst 1/activator 1 has a longer methylene sequence than that prepared with catalyst 2/activator 2 based on $^{13}$C NMR studies, Table 2. This leads to a $T_m$ of 30° C. higher for the mEPC prepared with catalyst 1/activator 1 compared to samples from the catalyst 2/activator 2 catalyst system. In Table 2, the values of wt % $C_2$ of mEPC determined by $^{13}$C NMR and FTIR are close, at least for these 3 copolymers. The difference is less than or equal to 0.5 wt %. The values of $r_1$ and $r_2$ denote the reactivity ratios, which represent the ratios of the rate constants describing the addition of a like monomer relative to an unlike monomer. If the $r_1r_2$ value is less than unity as measured for sample 1, it represents more alternating or random sequences. If $r_1$ and $r_2$ are both large but not infinite, as shown for sample 2 and sample 3, then block or blocky copolymers will be produced, or perhaps some homopolymers may be present, depending on how large the reactivity ratios are and the relative concentration of the monomers in the feed. Additionally, individual reactivity ratios were estimated from continuous polymerization reactor data (experiments from Table 1 plus additional experiments not reported having a total monomer conversion of 46-53 wt %) using a linear least squares algorithm to fit the data to the standard copolymer equation. Using this method, we estimate $r_1$=5.22, $r_2$=0.52, giving $r_1r_2$=2.71, which is also in good agreement with the reported $^{13}$C NMR results.

TABLE 1a

Process Conditions and Characterization of Some mEPCs Prepared with catalyst 1/activator 1

| Sample #: | 2 | 3 | 4 | 5 | 6 | 7 | 8 | 10 |
|---|---|---|---|---|---|---|---|---|
| Temperature, ° C. | 80 | 80 | 80 | 80 | 80 | 80 | 80 | 80 |
| Pressure, psig | 320 | 320 | 320 | 320 | 320 | 320 | 320 | 320 |
| Feed $C_2$, g/min | 2.40 | 3.12 | 3.12 | 2.76 | 2.40 | 2.03 | 3.12 | 1.67 |
| Feed $C_3$, g/min | 3.60 | 4.80 | 4.80 | 4.20 | 3.60 | 3.00 | 4.80 | 2.40 |
| Solvent (isohexane), g/min | 61.23 | 61.23 | 61.23 | 61.23 | 61.23 | 61.23 | 61.23 | 61.23 |
| catalyst 1, mol/min | $7.34 \times 10^{-8}$ | $5.51 \times 10^{-8}$ | $7.34 \times 10^{-8}$ | $7.34 \times 10^{-8}$ | $7.34 \times 10^{-8}$ | $7.34 \times 10^{-8}$ | $6.43 \times 10^{-8}$ | $7.34 \times 10^{-8}$ |
| activator 1, mol/min | $7.49 \times 10^{-8}$ | $5.62 \times 10^{-8}$ | $7.49 \times 10^{-8}$ | $7.49 \times 10^{-8}$ | $7.49 \times 10^{-8}$ | $7.49 \times 10^{-8}$ | $6.56 \times 10^{-8}$ | $7.49 \times 10^{-8}$ |
| Catalyst Activity (g/g) | 74700 | 115500 | 114863 | 96187 | 80550 | 66488 | 109286 | 53775 |
| Polymer $C_2$, Wt % (FTIR) | 53.3 | 54.8 | 50.9 | 51.9 | 52.3 | 52.8 | 53.4 | 52.8 |
| LS $M_w$, kg/mol | 240 | 235 | 240 | 224 | 201 | 172 | 233 | 144 |
| DRI $M_w/M_n$ | 2.26 | 2.60 | 2.44 | 2.34 | 2.36 | 2.41 | 2.40 | 2.52 |
| $g'_{vis}$ | 0.889 | 0.933 | 0.865 | 0.884 | 0.878 | 0.878 | 0.913 | 0.875 |
| GPC-3D Mass Recovery, % | 90 | 100 | 94 | 95 | 94 | 97 | 99 | 100 |
| ML | 47 | 82 | 50 | 59 | 48 | 38 | 68 | 29 |
| MLRA | 326 | 604 | 529 | 500 | 368 | 276 | 543 | 177 |
| $T_m$, ° C. | −2.7 | 1.3 | −1.7 | −7.6 | −7.9 | −6.2 | −1.8 | |
| $H_f$, J/g | 17 | 23 | 11 | 18 | 17 | 17 | 22 | |

TABLE 1b

Process Conditions and Select Characterization of Some mEPCs Prepared with catalyst 2/activator 2

| Sample #: | 1 | 9 | 11 | 12 | 13 | 14 |
|---|---|---|---|---|---|---|
| Temperature, ° C. | 120 | 120 | 120 | 120 | 120 | 120 |
| Pressure, psig | 320 | 320 | 320 | 320 | 320 | 320 |
| Feed $C_2$, g/min | 4.10 | 4.10 | 4.07 | 4.07 | 4.07 | 4.07 |
| Feed $C_3$, g/min | 4.30 | 4.30 | 4.30 | 4.30 | 4.30 | 4.30 |
| isohexane, g/min | 61.23 | 61.23 | 61.23 | 61.23 | 61.23 | 61.23 |
| catalyst 2, mol/min | $7.06 \times 10^{-8}$ | $6.36 \times 10^{-8}$ | $7.06 \times 10^{-8}$ | $4.24 \times 10^{-8}$ | $4.94 \times 10^{-8}$ | $5.65 \times 10^{-8}$ |
| activator 2, mol/min | $7.21 \times 10^{-8}$ | $6.49 \times 10^{-8}$ | $7.21 \times 10^{-8}$ | $4.32 \times 10^{-8}$ | $5.05 \times 10^{-8}$ | $5.77 \times 10^{-8}$ |
| Catalyst Activity (g/g) | 112500 | 118083 | 109275 | 125625 | 120750 | 107719 |
| Polymer $C_2$, Wt % (FTIR) | 55.5 | 56.3 | 55.6 | 62.3 | 60.1 | 60.1 |

TABLE 2

$^{13}$C NMR Results of mEPCs

| | Sample | | |
|---|---|---|---|
| | 1 | 2 | 3 |
| | Catalyst/Activator | | |
| | catalyst 2/ activator 2 | catalyst 1/ activator 1 | catalyst 1/ activator 1 |
| Mol % C$_2$ (NMR) | 65.6 | 63.0 | 64.8 |
| Mol % C$_3$ (NMR) | 34.4 | 37.0 | 35.2 |
| Wt % C$_2$ (NMR) | 56.0 | 53.2 | 55.2 |
| Wt % C$_3$ (NMR) | 44.0 | 46.8 | 44.8 |
| Wt % C$_2$ (FTIR) | 55.5 | 53.3 | 54.8 |
| Wt % C$_3$ (FTIR) | 44.5 | 46.7 | 45.2 |
| Run# | 26.7 | 17.7 | 17.4 |
| Average Sequence Length for Methylene Sequences Two and Longer | 5.9 | 8.2 | 8.5 |
| Average Sequence Length for Methylene Sequences Six and Longer | 10.3 | 12.7 | 13.2 |
| $r_1 r_2$ | 0.41 | 2.8 | 2.8 |

TABLE 2a

Methylene Sequence Length Distribution

| Methylene Sequence of Length (N) | Percentage of Sequences of Length N | | |
|---|---|---|---|
| | sample 1 | sample 2 | sample 3 |
| 2 | 1 | 1 | 1 |
| 3 | 42 | 27 | 27 |
| 4 | 1 | <1 | <1 |
| 5 | 23 | 23 | 23 |
| 6+ | 31 | 48 | 49 |

Tables 2 and 2a contain chain punctuation data determined from $^{13}$C NMR spectra. Chain punctuation can be evaluated using the Run# which represents the number of times that a comonomer changes from one type to the other per 100 monomers. At a given comonomer level a lower Run# indicates that the comonomer is more blocked. Blockiness can also be evaluated by calculating an average methylene sequence length which is determined by dividing the methylene content by the total number of sequences. Therefore, at a particular methylene concentration the average sequence length will necessarily be longer with a lower number of methylene runs or sequences. In Table 2 average sequence length for all methylene sequences 2 and longer and 6 and longer are shown. Sample 1 made with the catalyst 2/activator 2 catalyst system has shorter methylene sequences on average than samples made with catalyst 1/activator 1. The longer sequences in the catalyst 1/activator 1 polymers correlate with their higher level of crystallinity relative to the catalyst 2/activator 2 sample.

Table 2a contains the methylene sequence length distribution in the copolymers determined by $^{13}$C NMR. Sample 1 made with catalyst 2/activator 2 has a more even distribution of sequences relative the catalyst 1/activator 1 polymers. Catalyst 1/activator 1 samples have a lower percentage of shorter sequences and a higher amount of longer ones compared to the catalyst 2/activator 2 polymer. The greater proportion of longer sequences in the catalyst 1/activator 1 polymers is consistent with them having more crystallinity compared to the catalyst 2/activator 2 polymer.

Figure 3A:
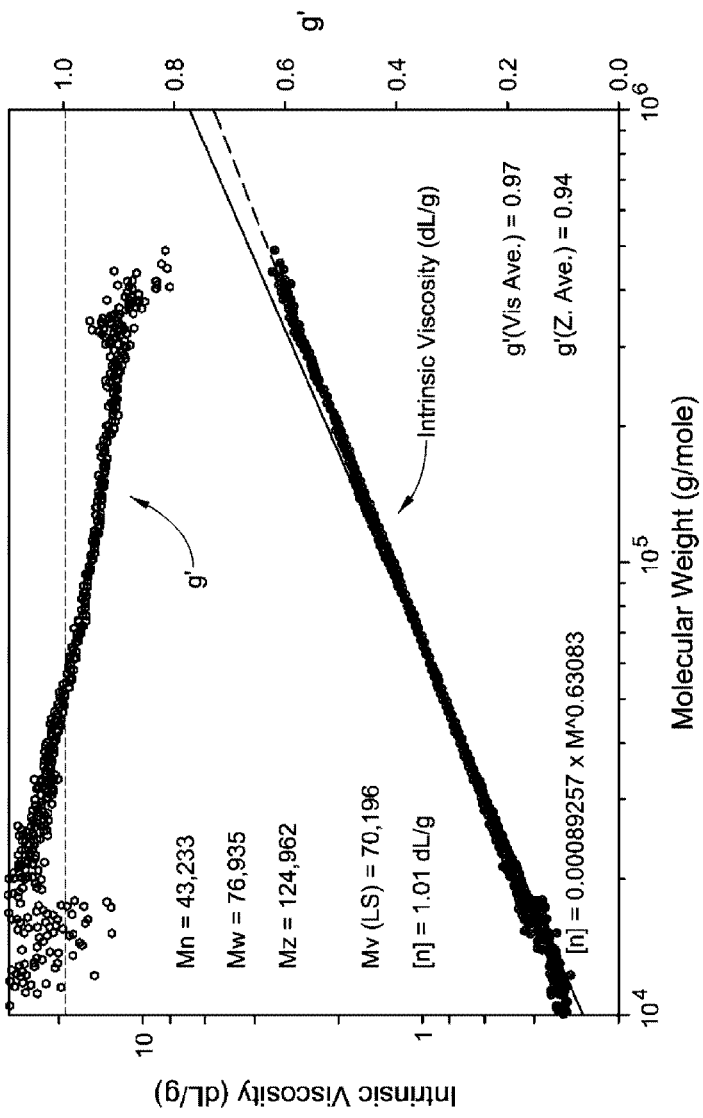
FIG. 3 (a-c) is a GPC-3D curve for sample 1 prepared with catalyst 2/activator 2. Run conditions and instrument and polymer parameters: Inject Mass (mg)=0.2784; Calc. Mass (mg)=0.256 (91.9%); Adjusted Flow Rate (ml/m)= 0.543; Column Cal. C0=12.474; Column Cal. C1=−0.31335; Column Cal. C2=−0.0025044; Column Cal. C3=0; Inject Mark (ml)=31.837; Vistalon B1=0.953; Random Coil Analysis (5); A2 (Input Value)=0.00106; (dn/dc)=0.104; LS to DRI (ml)=0.152; LS to Vis. (ml)=0.385; K (sample)= 0.00042613; alpha (sample)=0.699; LS Calib. Const.=1.5348e-05; DRI Const.=3.364e-05; DP Const.=0.8722; IP Baseline=27.3 KPa.
Figure 3B:
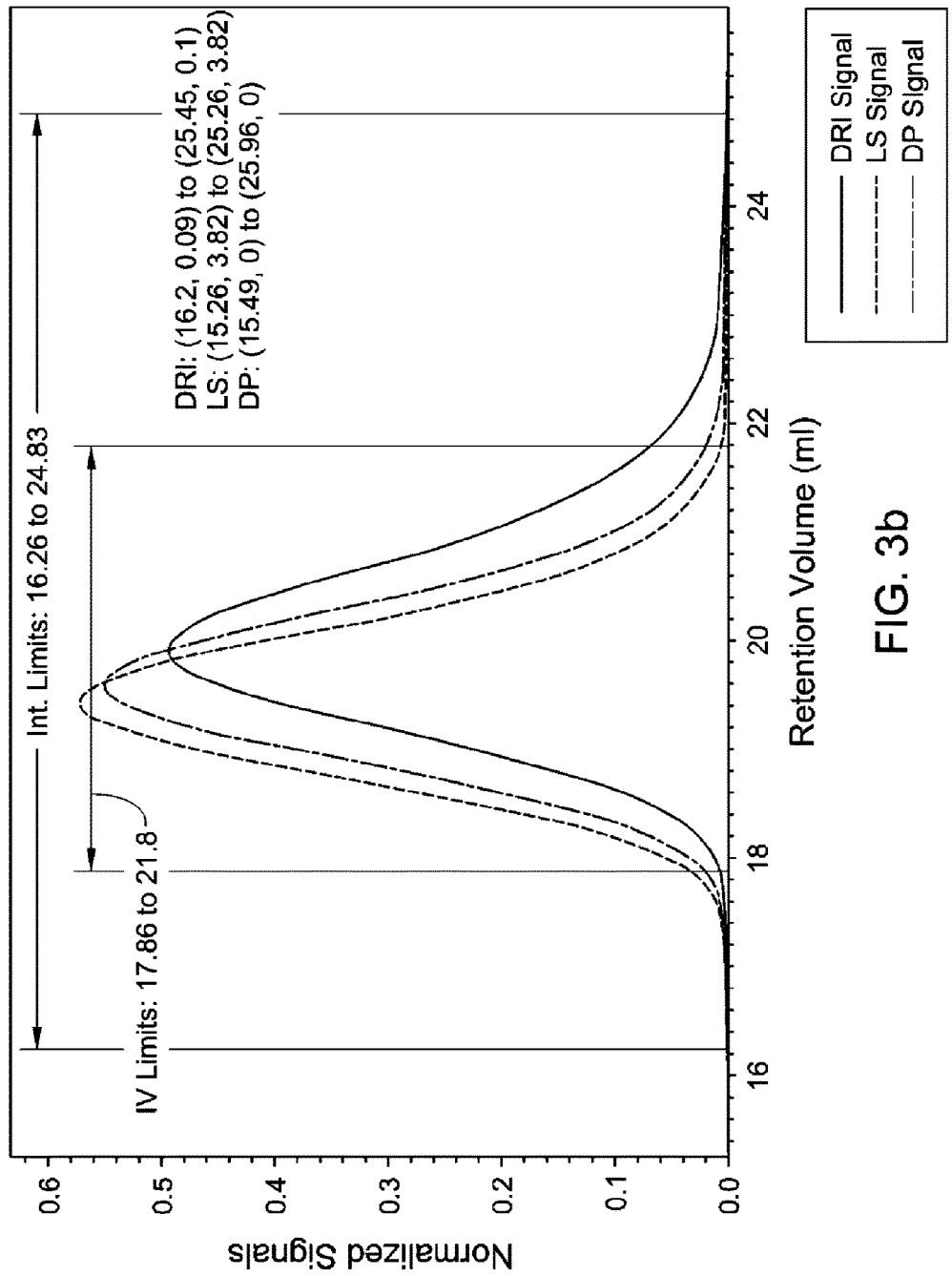
Figure 3C:
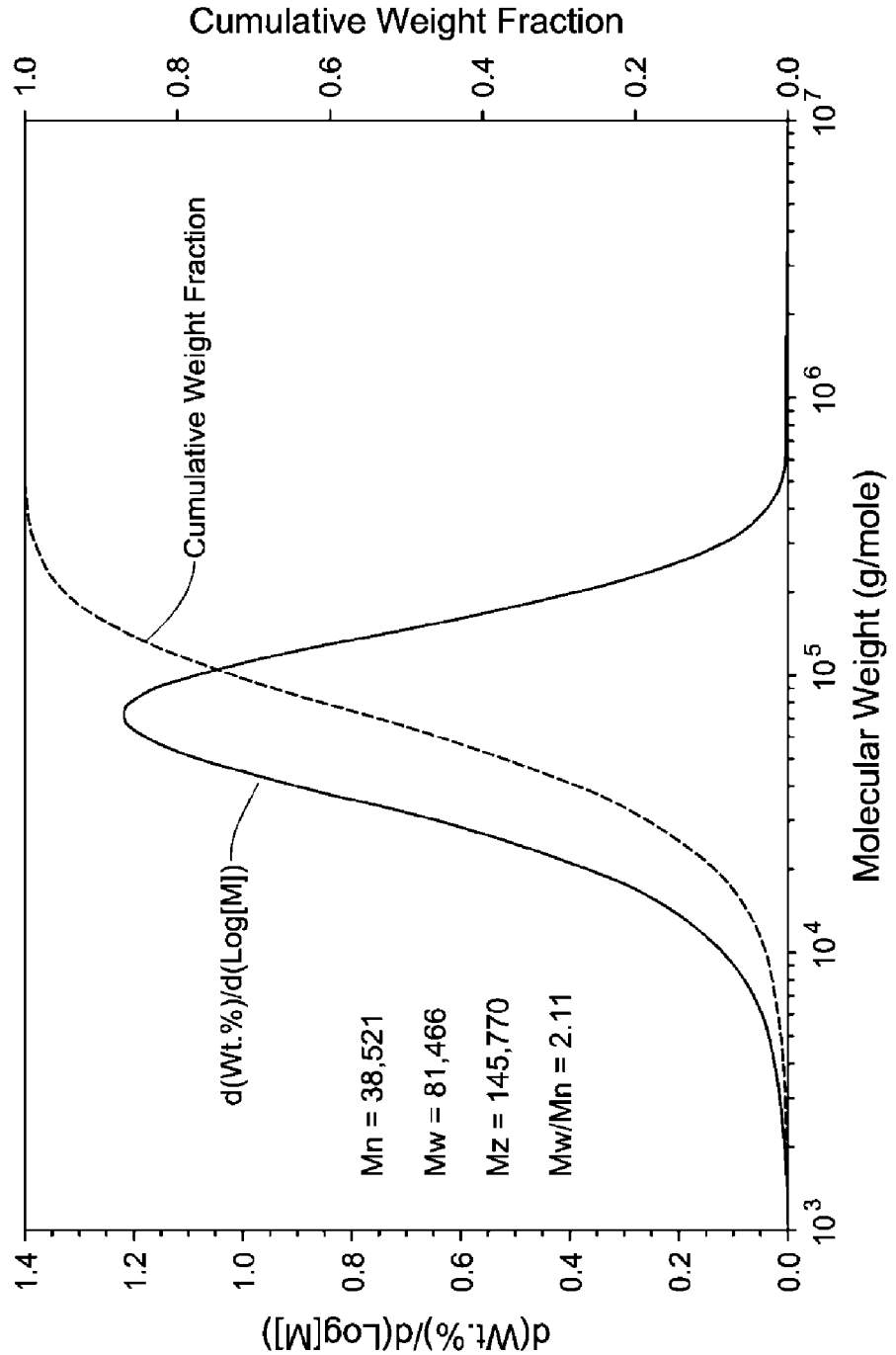
Figure 4A:
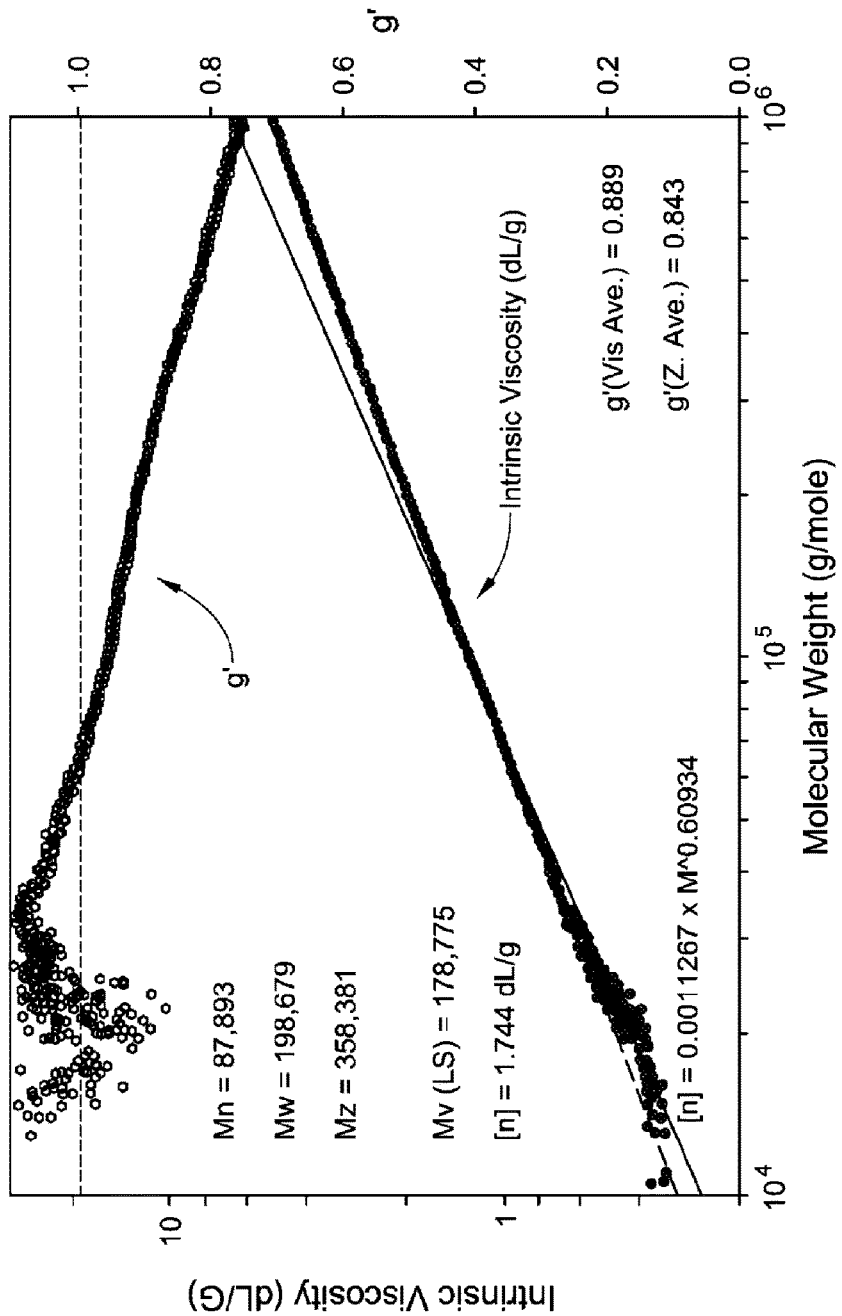
FIG. 4 (a-c) is a GPC-3D curve for sample 2 prepared with catalyst 1/activator 1. Run conditions and instrument and polymer parameters: Inject Mass (mg)=0.46; Calc. Mass (mg)=0.415 (90.2%); Adjusted Flow Rate (ml/m)=0.543; Column Cal. C0=12.474; Column C1=−0.31335; Column Cal. C2=−0.0025044; Column Cal. C3=0; Inject Mark (ml)= 31.837; Vistalon B1=0.846; Random Coil Analysis (5); A2 (Input Value=0.001033; (dn/dc)=0.104; LS to DRI (ml)= 0.152; LS to Vis. (ml)=0.385; K (sample)=0.00041796; alpha (sample)=0.699; LS Calib. Const.=1.5348e-05; DRI Const.=3.364e-05; DP Const.=0.8722; IP Baseline=27.3 KPa.
Figure 4B:
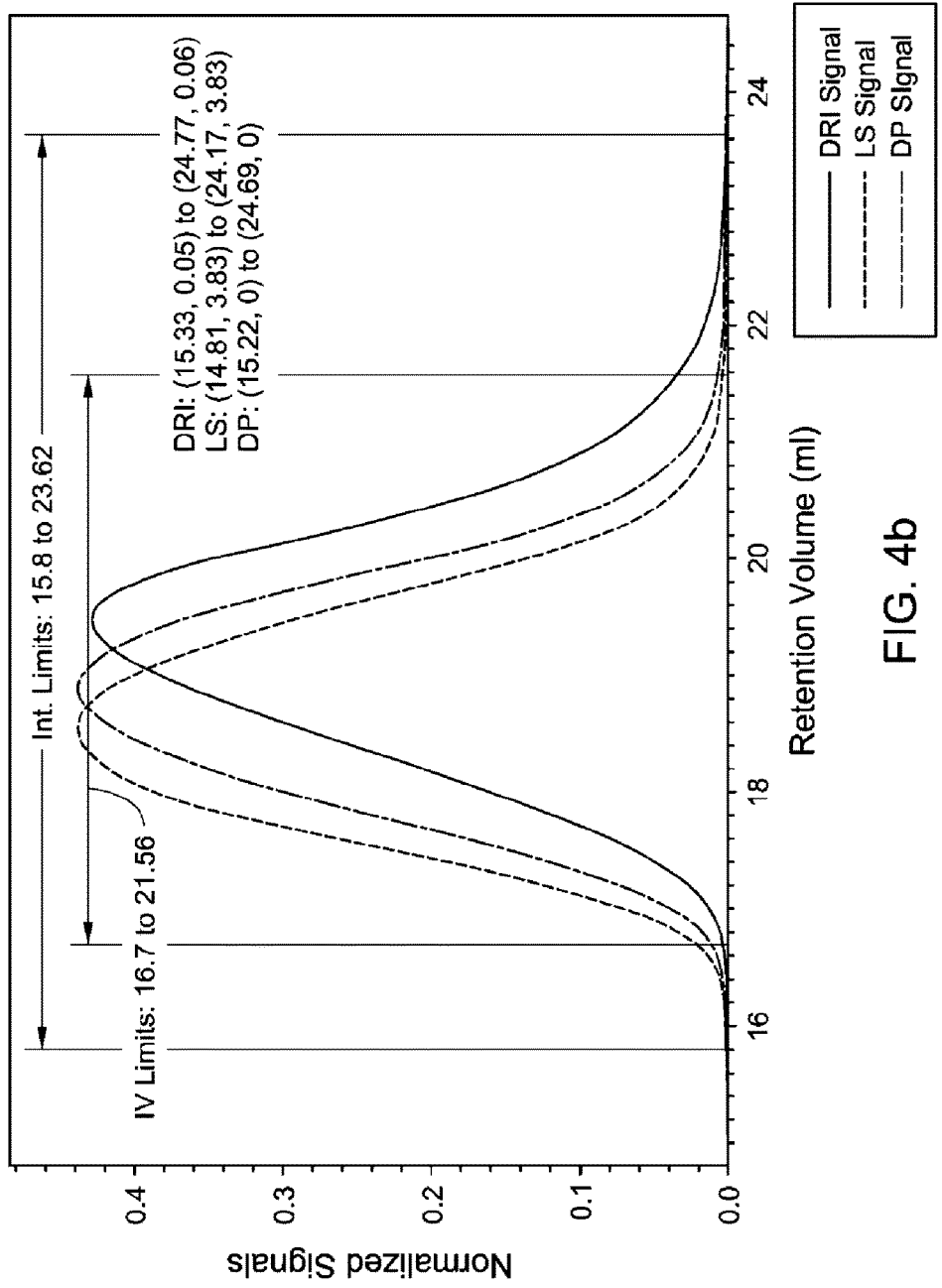
Figure 4C:
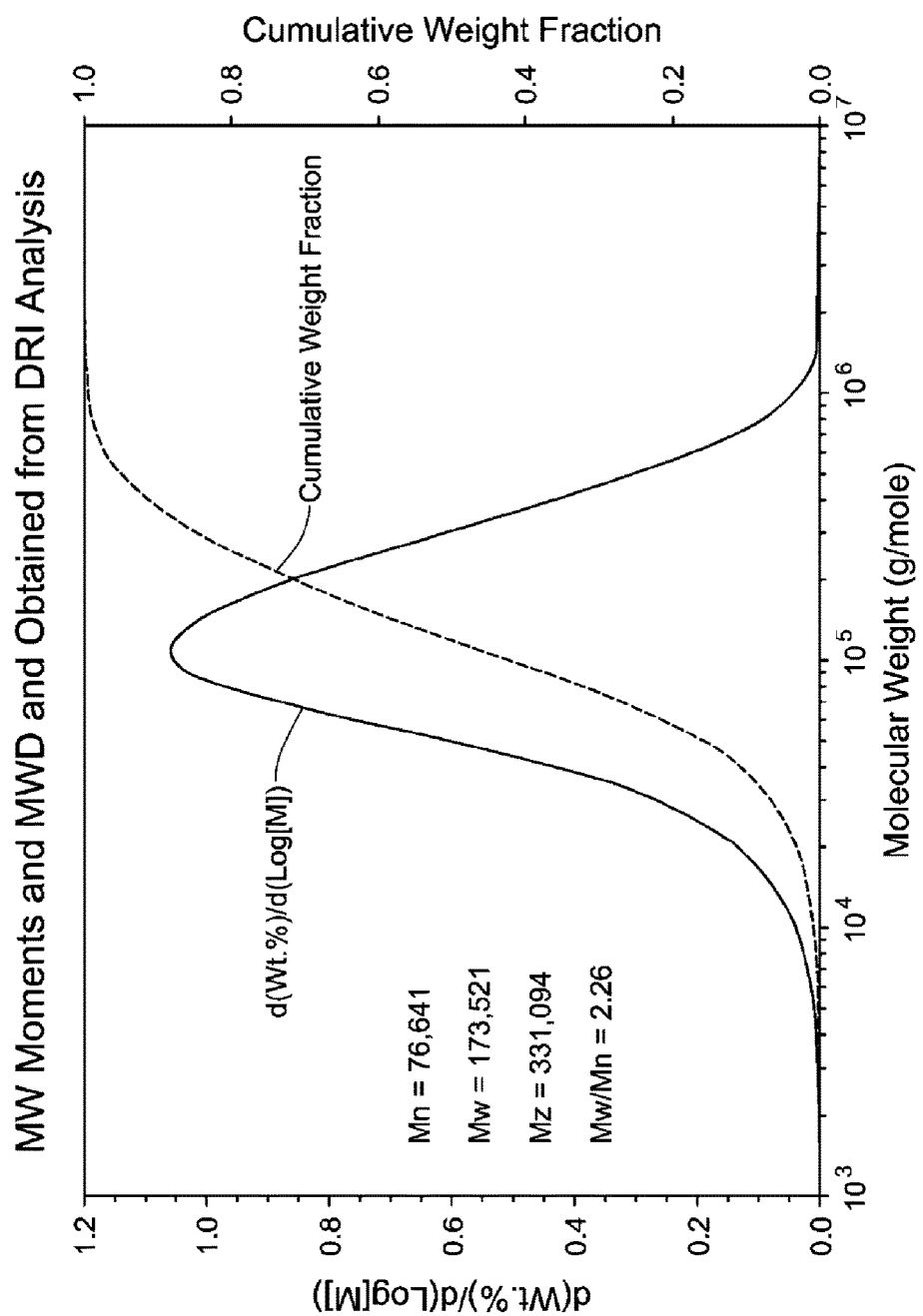
Figure 5A:
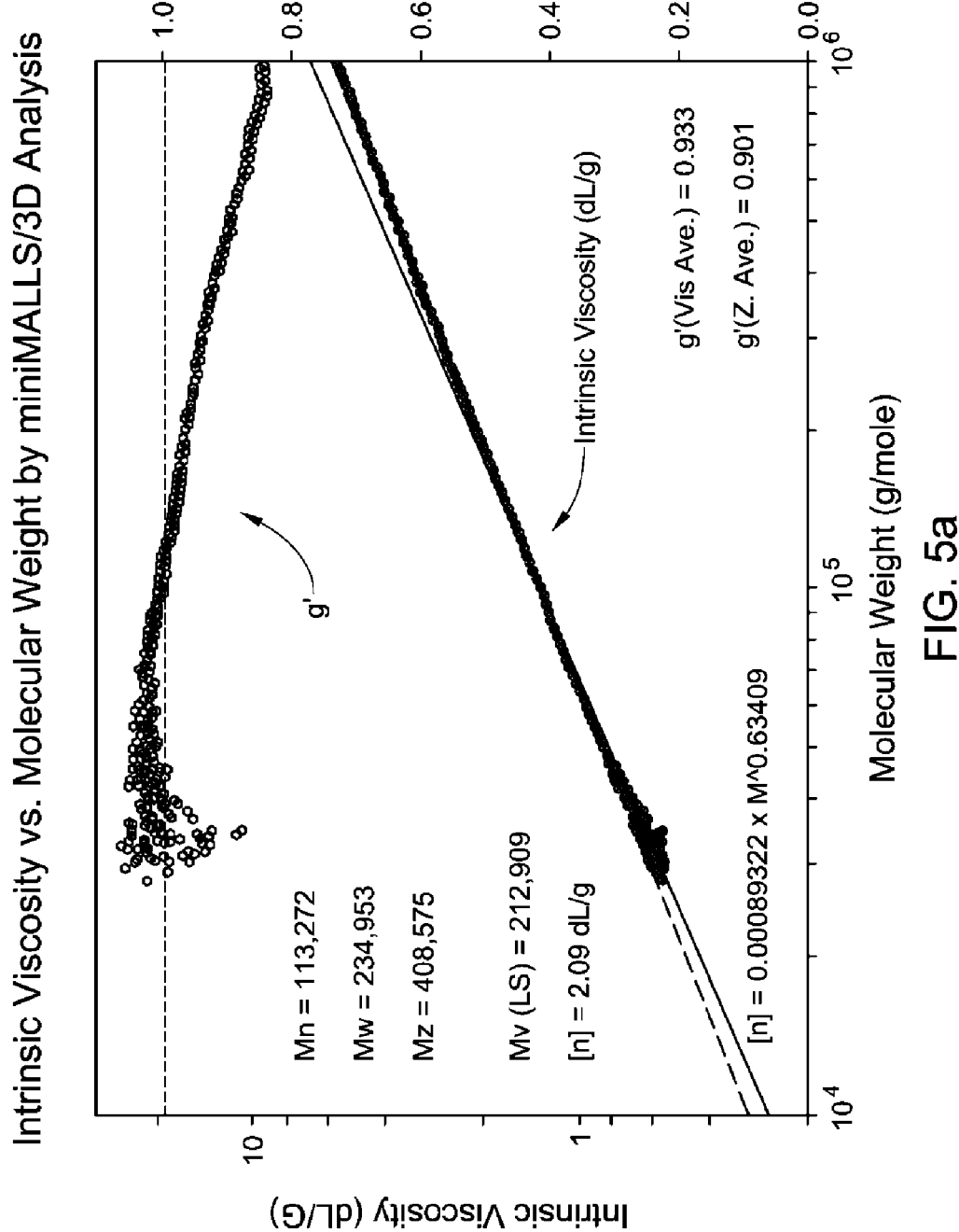
FIG. 5 (a-c) is a GPC-3D curve for sample 3 prepared with catalyst 1/activator 1. Run conditions and instrument and polymer parameters: Inject Mass (mg)=0.267; Calc. Mass (mg)=0.286 (107%); Adjusted Flow Rate (ml/m)=
Figure 5B:
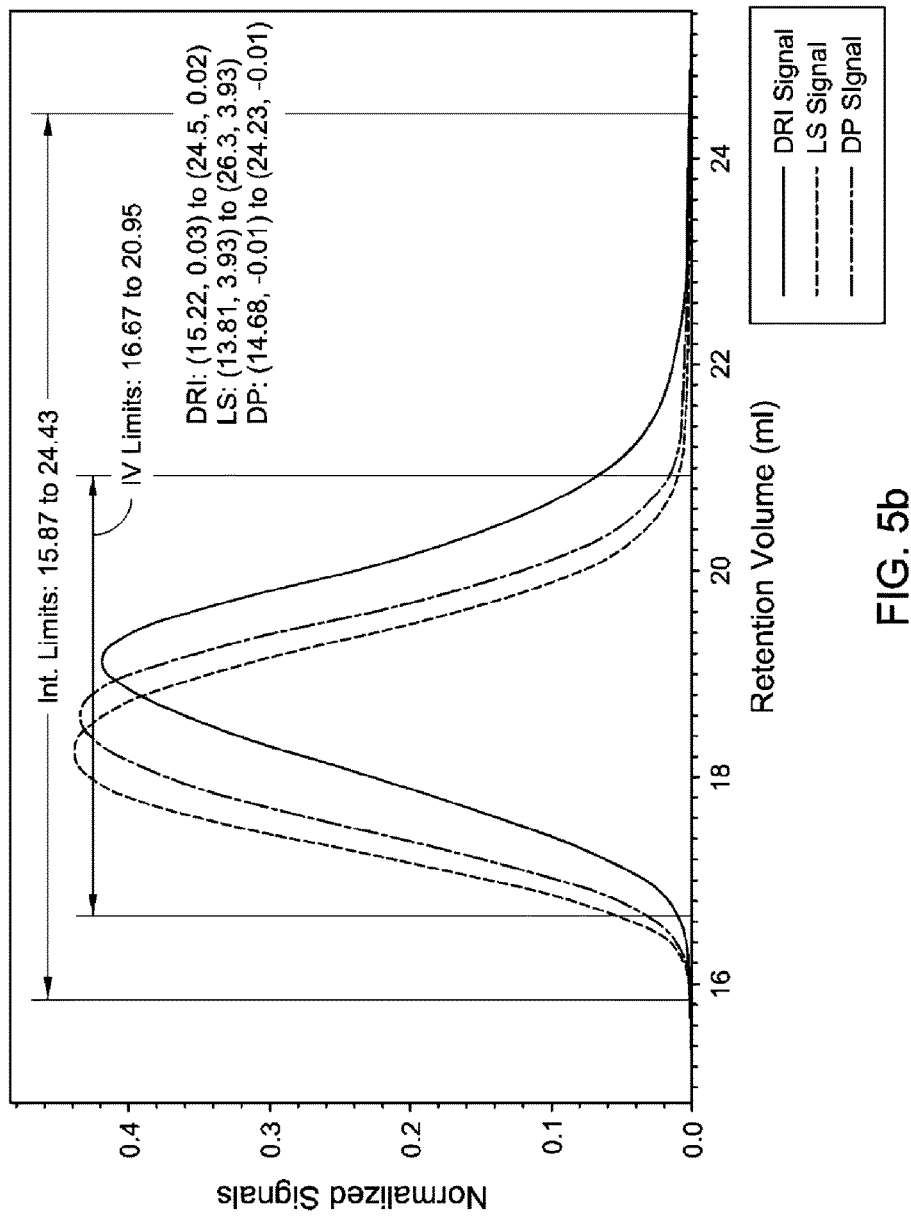
Figure 5C:
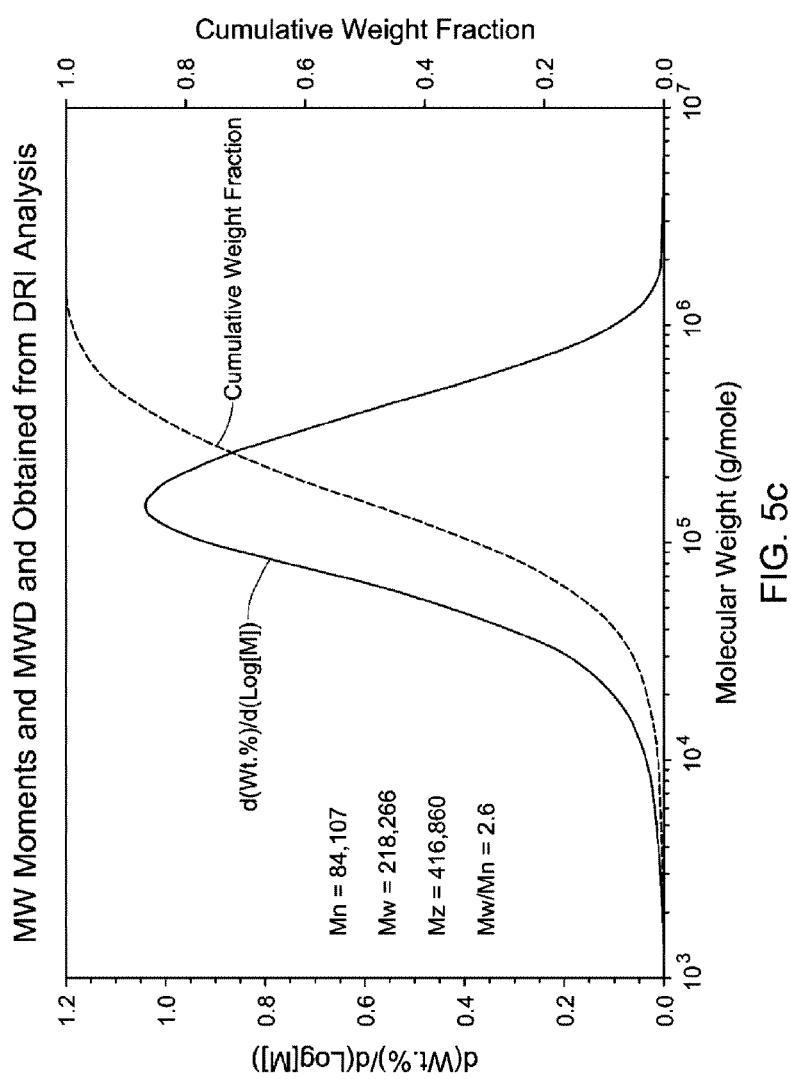

FIGS. 3-5 show the GPC-3D traces of the 3 mEPCs described in Table 2. No shoulders or extra peaks that would cause the higher $T_m$ values for the two mEPCs prepared with catalyst 1/activator 1 were noted.

Table 3 shows the GPC-3D, ML and MLRA results of a set of mEPCs made by catalyst 2/activator 2 or catalyst 1/activator 1. These mEPCs have similar molecular weights or ML and similar C$_2$ contents. These copolymers have essentially no gel because the values of GPC-3D mass recovery are all greater than or equal to 90%. The mEPCs made by catalyst 1/activator 1 show more branching, as indicated by small values of g' and larger values of MLRA. The larger MLRA is due to the fact that, after the release of an applied deformation in the Mooney rheometer, the branched mEPC takes a longer time to relax relative to a linear mEPC, leading to a larger relaxation area under the Mooney torque curve. At similar molecular weights, the mEPCs prepared with catalyst 1/activator 1 also have larger values of tensile strength and elongation at break than the mEPC prepared with catalyst 2/activator 2, FIG. 6.

TABLE 3

GPC-3D and Mooney Viscosity of mEPCs

| Sample | Catalyst | LS $M_n$, kg/mol | LS $M_w$, kg/mol | DRI $M_w/M_n$ | $g'_{vis}$ | GPC-3D Mass Recovery, % | C$_2$, Wt % (FTIR) | ML | MLRA |
|---|---|---|---|---|---|---|---|---|---|
| 9 | catalyst 2/ activator 2 | 78 | 152 | 2.05 | 0.993 | 95 | 56.3 | 38 | 126 |
| 7 | catalyst 1/ activator 1 | 73 | 172 | 2.41 | 0.878 | 97 | 52.8 | 38 | 276 |
| 10 | catalyst 1/ activator 1 | 65 | 144 | 2.52 | 0.875 | 100 | 52.8 | 29 | 177 |

Additional evidence for the existence of branch structure in mEPCs prepared with catalyst 1/activator 1 is based on $^1$H NMR results shown in Table 4, where N' is the number of terminal vinyl double bonds per chain by assuming any double bond detected by $^1$H NMR is at the chain end. The value of N' can be determined by the following equation:

$$N'=[(\text{vinyls}/1{,}000\ C)/1{,}000](M_n/14)$$

wherein Mn the number average molecular weight (g/mol) from GPC LS (LS=light scattering) and the vinyls/1,000 C are as determined from proton NMR.

The N' value of mEPC made using catalyst 1/activator 1 is much higher than that from the catalyst 2/activator 2 sample. There are 75 chains containing the terminal vinyl double bond in every 100 chains of the mEPC made from catalyst 1/activator 1. Thus, sample 2 has 75% terminal vinyl double bonds per chain also referred to as vinyl chain end functionality (VCEF). For the mEPC made with the catalyst 2/activator 2 catalyst system, there are only 5 chains containing the terminal vinyl double bonds in every 100 chains. The greater number of chains terminating with a double bond can result in more branching by increasing the probability of polymer reincorporation during polymerization.

rheological measurements at 190° C., FIGS. 8a and 8b. The following ratio:

$$[\eta^*(0.1\ \text{rds})-\eta^*(100\ \text{rds})]/\eta^*(0.1\ \text{rds})$$

was used to measure the degree of shear thinning of the polymeric materials of the embodiments herein, where $\eta^*(0.1\ \text{rds})$ and $\eta^*(100\ \text{rds})$ are the complex viscosities at frequencies of 0.1 and 100 rds, respectively, measured at 190° C. The higher this ratio, the higher is the degree of shear thinning. The ratios for the mEPCs prepared with catalyst 1/activator 1 range from 0.987 to 0.993, whereas those prepared with catalyst 2/activator 2 range from 0.957 to 0.973. Therefore, the former set of mEPCs has higher degrees of shear thinning, hence better melt processability.

In terms of application, the mEPC prepared with catalyst 1/activator 1 will be a better compatibilizer for the blends of ethylene-based polymers or copolymers and propylene-

TABLE 4

Proton NMR Results of mEPCs

| Sample | Catalyst/Activator | LS $M_n$, kg/mol | $g'_{vis}$ | GPC-3D Mass Recovery, % | Vinyls/1,000 C | N' | VCEF, % |
|---|---|---|---|---|---|---|---|
| 11 | catalyst 2/activator 2 | 38 | 0.963 | 92 | 0.02 | 0.05 | 5 |
| 2 | catalyst 1/activator 1 | 88 | 0.889 | 90 | 0.12 | 0.75 | 75 |

Another method to detect the existence of branch structure in these mEPCs is based on small-strain rheology as shown in FIGS. 7a and 7b for the samples prepared using the catalyst 1/activator 1 and catalyst 2/activator 2 catalyst, respectively. In these rheological measurements, the test temperature was 190° C. and the shear strain applied was 10%. The complex modulus (G*), the phase angle (δ), and the complex viscosity (η*) were measured as the frequency was varied from 0.01 to 100 rad/s. The plots of phase angle versus the complex modulus in FIGS. 7a and 7b are known as the Van Gurp-Palmen plots (Please see M. Van Gurp, J. Palmen, Rheol. Bull., 1998, 67, 5-8). The lower the δ, the higher is the melt elasticity or melt strength. Because FIGS. 7a and 7b are in the same scale, it is evident that the phase angles are lower for mEPCs from catalyst 1/activator 1 than from catalyst 2/activator 2 in the region of G* from 10,000 to 100,000 Pa. Therefore, the former set of mEPCs has higher melt strength. The dependence of complex viscosity as a function of frequency can also be determined from these based polymers or copolymers than the mEPC prepared with catalyst 2/activator 2 because the former type of mEPC has both a longer ethylene sequence and a branched topology.

Examples 12, 13 and 14 from Table 1b and are further described in Table 5. This data corresponds to the data in FIGS. 7b and 8b, where Samples 12, 13, and 14 from top to bottom in the legend.

TABLE 5

Select Characterization of Some mEPCs Prepared with catalyst 2/activator 2

| Sample | LS $M_w$, kg/mol | DRI $M_w/M_n$ | $g'_{vis}$ | GPC-3D Mass Recovery, % | $C_2$, Wt % | $T_m$, ° C. | $H_f$, J/g | $T_g$, ° C. | ML | MLRA |
|---|---|---|---|---|---|---|---|---|---|---|
| 12 | 243 | 2.12 | 1.009 | 93 | 62.3 | −6.0 | 25 | −48 | 104 | 317 |
| 13 | 211 | 2.10 | 1.011 | 93 | 60.6 | −11 | 23 | −50 | 81 | 264 |
| 14 | 188 | 1.99 | 0.993 | 94 | 60.1 | −16 | 21 | −52 | 57 | 192 |

The invention claimed is:

1. A branched ethylene-propylene copolymer comprising:
   at least 50% ethylene content by weight as determined by FTIR;
   a $g'_{vis}$ of less than 0.98;
   a $T_m$ value from −10° C. to 40° C.;
   a methylene sequence length of 6 or greater as determined by $^{13}$C NMR, wherein the percentage of sequences of the length of 6 or greater is more than 32%; and
   wherein greater than 50% vinyl chain end functionality is present.

2. The branched ethylene-propylene copolymer of claim 1, wherein the $g'_{vis}$ is less than 0.95.

3. The branched ethylene-propylene copolymer of claim 1, wherein the ethylene-propylene copolymer has a ratio of percentage of saturated chain ends to percentage of vinyl chain that is greater than 1.

4. The branched ethylene-propylene copolymer of claim 1, wherein the ethylene-propylene copolymer has a heat of fusion from 5 J/g to 50 J/g.

5. The branched ethylene-propylene copolymer of claim 1, wherein the ethylene-propylene copolymer has a Mooney viscosity (ML) range at 125° C. of from 29 to 100 Mooney units (MU).

6. The branched ethylene-propylene copolymer of claim 1, wherein the branched ethylene-propylene copolymer has a Mooney large relaxation area (MLRA) of from 100 to 1000 MU-sec.

7. The branched ethylene-propylene copolymer of claim 1, wherein the branched ethylene-propylene copolymer has a nominal stress range of from 0.22 MPa to 0.32 MPa at a 50% strain and 0.15 MPa to 0.2 MPa at 150% strain, at a pull rate of 5.08 centimeters/minute.

8. The branched ethylene-propylene copolymer of claim 1, wherein the branched ethylene-propylene copolymer ethylene content is from 50% to 55%.

9. A branched ethylene-propylene copolymer comprising:
at least 50% ethylene content by weight as determined by FTIR;
a $g'_{vis}$ of less than 0.98;
a Mooney viscosity (ML) range at 125° C. of from 29 to 100 Mooney units (MU);
a methylene sequence length of 6 or greater as determined by $^{13}C$ NMR, wherein the percentage of sequences of the length of 6 or greater is more than 32%; and
wherein greater than 50% vinyl chain end functionality is present.

* * * * *